United States Patent
Min et al.

(10) Patent No.: US 9,871,940 B2
(45) Date of Patent: Jan. 16, 2018

(54) INFORMATION PROCESSING SYSTEM, INFORMATION PROCESSING APPARATUS, AND METHOD FOR PROCESSING INFORMATION

(71) Applicants: Zhi Min, Tokyo (JP); Yuuichiroh Hayashi, Kanagawa (JP); Hikaru Kominami, Kanagawa (JP); Kazunori Sugimura, Kanagawa (JP); Kohsuke Namihira, Kanagawa (JP); Ryutaro Sakanashi, Kanagawa (JP); Dongzhe Zhang, Tokyo (JP)

(72) Inventors: Zhi Min, Tokyo (JP); Yuuichiroh Hayashi, Kanagawa (JP); Hikaru Kominami, Kanagawa (JP); Kazunori Sugimura, Kanagawa (JP); Kohsuke Namihira, Kanagawa (JP); Ryutaro Sakanashi, Kanagawa (JP); Dongzhe Zhang, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/232,945

(22) Filed: Aug. 10, 2016

(65) Prior Publication Data

US 2017/0054865 A1  Feb. 23, 2017

(30) Foreign Application Priority Data

Aug. 19, 2015  (JP) .................................. 2015-161828
Oct. 30, 2015  (JP) .................................. 2015-215160

(51) Int. Cl.
*H04N 1/00* (2006.01)

(52) U.S. Cl.
CPC ..... *H04N 1/00949* (2013.01); *H04N 1/00042* (2013.01); *H04N 1/00344* (2013.01); *H04N 2201/0094* (2013.01)

(58) Field of Classification Search
CPC .......... H04N 1/00949; H04N 1/00042; H04N 1/00344; H04N 2201/0094
(Continued)

(56) References Cited

U.S. PATENT DOCUMENTS

| 7,551,303 B2* | 6/2009 | Hikawa ............. H04N 1/00209 358/1.13 |
| 7,876,465 B2 | 1/2011 | Matsueda |

(Continued)

FOREIGN PATENT DOCUMENTS

| JP | 2006-338069 | 12/2006 |
| JP | 2007-164455 | 6/2007 |
| JP | 5112085 | 1/2013 |

*Primary Examiner* — Neil R McLean
(74) *Attorney, Agent, or Firm* — IPUSA, PLLC

(57) ABSTRACT

An information processing system implements a receiving unit receiving a request including app identification information, first flow identification information, information related to electronic data used in a first sequence of processes from one apparatus among from at least one apparatus coupled to the information processing system, and a process executing unit causing each program of the at least one program identified by program identification information defined by first flow identification information included in the request in association with the app identification information included in the request received by the receiving unit to be executed according to an execution order defined in the first flow information, and, in response to the error occurring in the first sequence of processes, causes the each program to be executed in the execution order defined in the second flow information to execute the second sequence of processes.

15 Claims, 31 Drawing Sheets

(58) Field of Classification Search
USPC .......................................................... 358/1.14
See application file for complete search history.

(56) References Cited

U.S. PATENT DOCUMENTS

| | | |
|---|---|---|
| 8,782,666 B2 | 7/2014 | Kawamoto |
| 2013/0021643 A1* | 1/2013 | Nuggehalli ........ H04N 1/00331 |
| | | 358/1.15 |

* cited by examiner

FIG.5A

| COMMON I/F OF FILE PROCESSING UNIT | |
|---|---|
| COMMON I/F | SUMMARY |
| /EXTERNAL SERVICE NAME/process/file | ACQUIRING FILE FROM DESIGNATED STORAGE SERVICE |
| /EXTERNAL SERVICE NAME/process/folder | STORING FILE IN DESIGNATED STORAGE SERVICE |
| ... | ... |

FIG.5B

| UNIQUE I/F OF FILE PROCESSING UNIT | |
|---|---|
| UNIQUE I/F | SUMMARY |
| /EXTERNAL SERVICE NAME /process/extension/attach | ADDING FILE TO DOCUMENT STORED IN DESIGNATED STORAGE SERVICE |
| ... | ... |

FIG.5C

| COMMON I/F OF DATA PROCESSING UNIT | |
|---|---|
| COMMON I/F | SUMMARY |
| /EXTERNAL SERVICE NAME/data/files | ACQUIRING FILE VIEW FROM DESIGNATED STORAGE SERVICE |
| /EXTERNAL SERVICE NAME/data/folders | ACQUIRING FOLDER VIEW FROM DESIGNATED STORAGE SERVICE |
| ... | ... |

FIG.5D

| UNIQUE I/F OF DATA PROCESSING UNIT | |
|---|---|
| UNIQUE I/F | SUMMARY |
| /EXTERNAL SERVICE NAME /data/extension/images | ACQUIRING IMAGE FILE VIEW FROM DESIGNATED STORAGE SERVICE |
| ... | ... |

FIG.6A

```
                                              1100
┌─────────────────────────────────────┐
│  appid : app001              ⎫      │
│                              ⎬ 1101 │
│  flowid : flow001            ⎭      │
│  From("file : input")        ⎫      │
│  .to("process : ocrA")       ⎪      │
│                              ⎬ 1102 │
│  .to("process : transA")     ⎪      │
│  .to("storage : uploadFileA")⎭      │
└─────────────────────────────────────┘
```

FIG.6B

```
                                              1200
┌─────────────────────────────────────┐
│  appid : app001              ⎫      │
│                              ⎬ 1201 │
│  flowid : flow002            ⎭      │
│  From("file : input")        ⎫      │
│  .to("process : ocrB")       ⎪      │
│                              ⎬ 1202 │
│  .to("process : transB")     ⎪      │
│  .to("storage : uploadFileB")⎭      │
└─────────────────────────────────────┘
```

FIG.8

| FLOW ID | SUBSTITUTE FLOW ID |
|---|---|
| flow001 | flow002 |
| flow002 | flow001 |
| flow003 | flow008 |
| ... | ... |

| FLOW ID | SUBSTITUTE FLOW ID | SUBSTITUTE FLOW TYPE |
|---------|--------------------|-----------------------|
| flow001 | flow002 | type1 |
| flow002 | flow001 | type1 |
| flow003 | flow008 | type2 |
| ... | ... | ... |

| FLOW ID | SUBSTITUTE FLOW ID | EXCEPTIONAL FLOW ID |
|---------|--------------------|--------------------|
| flow001 | flow002 | flow900 |
| flow002 | flow001 | flow901 |
| flow003 | flow008 | flow900 |
| ... | ... | ... |

| FLOW ID | COMPONENT ID | SUBSTITUTE COMPONENT ID |
|---|---|---|
| flow001 | ocrA | ocrB |
| flow001 | transA | transB |
| flow001 | uploadFileA | uploadFileB |
| flow002 | ocrB | ocrA |
| flow002 | uploadFileB | uploadFileA |
| ... | ... | ... |
| – | ocrA | ocrC |
| – | transB | transC |
| ... | ... | ... |

From("file : input")
.to("process : ocrB")  ---1301
.to("process : transA")
.to("storage : uploadFileA")

FIG.24

| FLOW ID | COMPONENT ID | SUBSTITUTE COMPONENT ID | SUBSTITUTE COMPONENT TYPE |
|---|---|---|---|
| flow001 | ocrA | ocrB | type1 |
| flow001 | transA | transB | type1 |
| flow001 | uploadFileA | uploadFileB | type2 |
| flow002 | ocrB | ocrA | type1 |
| flow002 | uploadFileB | uploadFileA | type1 |
| ... | ... | ... | ... |
| — | ocrA | ocrC | type2 |
| — | transB | transC | type2 |
| ... | ... | ... | ... |

```
flowtype"TYPE1"        ---1401
From("file : input")
.to("process : ocrB")  ---1402
.to("process : transA")
.to("storage : uploadFileA")
```

FIG.28

| FLOW ID | COMPONENT ID | SUBSTITUTE COMPONENT ID | EXCEPTIONAL COMPONENT ID |
|---|---|---|---|
| flow001 | ocrA | ocrB | exceptA |
| flow001 | transA | transB | exceptA |
| flow001 | uploadFileA | uploadFileB | exceptB |
| flow002 | ocrB | ocrA | exceptA |
| flow002 | uploadFileB | uploadFileA | exceptB |
| ... | ... | ... | ... |
| — | ocrA | ocrC | exceptB |
| — | transB | transC | exceptB |
| ... | ... | ... | ... |

From("file : input")
.to("process : exceptA")  ~~1501

— (1) —

INFORMATION PROCESSING SYSTEM, INFORMATION PROCESSING APPARATUS, AND METHOD FOR PROCESSING INFORMATION

CROSS-REFERENCE TO RELATED APPLICATIONS

The present application claims priority under 35 U.S.C. § 119 to Japanese Patent Application No. 2015-161828, filed Aug. 19, 2015 and Japanese Patent Application No. 2015-215160, filed Oct. 30, 2015. The contents of which are incorporated herein by reference in their entirety.

BACKGROUND OF THE INVENTION

Field of the Invention

The present disclosure relates to information devices, and in particular, relates to an information device that utilizes a touch screen.

The present invention relates to an information processing system, an information processing apparatus, and a method for processing information.

Description of the Related Art

In recent years, various external services are provided by cloud computing or the like, and a technique of a process, in which the external service and an apparatus collaborate, is known. For example, known is a technique of storing image data, which are acquired by scanning an original using an image forming apparatus, in an external storage service.

Further, known is a technique of generating a clerical flow for controlling component parts performing various processes based on a predetermined clerical flow model (for example, Japanese Patent No. 5112085). In this technique, the component parts are combined by the generated clerical flow, and sequential processes implementing a clerical process are performed.

SUMMARY OF THE INVENTION

According to an aspect of the embodiment of the present invention, there is provided an information processing system including at least one information processing apparatus and also including at least one program respectively executing predetermined processes, the information processing system including a hardware processor and a hardware storage, wherein the hardware storage is configured to implement a first memory unit storing, for each application executing a sequence of processes using electronic data, flow information which defines program identification information for identifying the at least one program executing each process of the sequence of processes and an execution order of the at least one program, app identification information identifying app identification information, and flow identification information identifying flow identification information while associating the flow information, the app identification information, and flow identification information; and a second memory unit storing first flow identification information identifying first flow information which defines the program identification information for identifying the at least one program executing each process of a first sequence of processes and an execution order of the at least one program, program identification information identifying the at least one program executing each process of a second sequence of processes, which is executed in response to an error that occurs in the first sequence of processes, and second flow identification information identifying second flow information defining the execution order of the at least one program while associating the first flow information, the program identification information, and the second flow identification information, wherein the hardware processor is configured to implement a receiving unit receiving a request including the app identification information, the first flow identification information, information related to electronic data used in the first sequence of processes from one apparatus among from at least one apparatus coupled to the information processing system; and a process executing unit causing each program of the at least one program identified by the program identification information defined by the first flow identification information included in the request from among the flow information stored in the first memory unit in association with the app identification information included in the request received by the receiving unit to be executed according to the execution order defined in the first flow information to execute the first sequence of processes the electronic data, wherein the process executing unit, in response to the error occurring in the first sequence of processes, causes the each program of the at least one program identified by the program identification information defined by the second flow information stored in the first memory unit to be executed in the execution order defined in the second flow information to execute the second sequence of processes using the electronic data.

BRIEF DESCRIPTION OF THE DRAWINGS

FIGS. 5A to 5D illustrate an exemplary common interface (I/F) and an exemplary unique I/F;

FIGS. 6A and 6B illustrate an exemplary process content of the first embodiment;

FIG. 8 illustrates an exemplary substitute-flow administering table of the first embodiment;

FIG. 14 illustrates an exemplary substitute-flow administering table of the second embodiment;

FIG. 17 illustrates an exemplary substitute-flow administering table of the third embodiment;

FIG. 20 illustrates an exemplary substitute-component administering table of the fourth embodiment;

FIG. 22 illustrates an exemplary process content of the fourth embodiment;

FIG. 24 illustrates an exemplary substitute-component administering table of the fifth embodiment;

FIG. 26 illustrates an exemplary process content of the fifth embodiment;

FIG. 28 illustrates an exemplary substitute-component administering table of the sixth embodiment;

FIG. 30 illustrates an exemplary process content of a sixth embodiment.

DESCRIPTION OF THE EMBODIMENTS

Hereinafter, an embodiment of the present invention is described in detail with reference to the figures.

First Embodiment

System Structure

Figure 1:
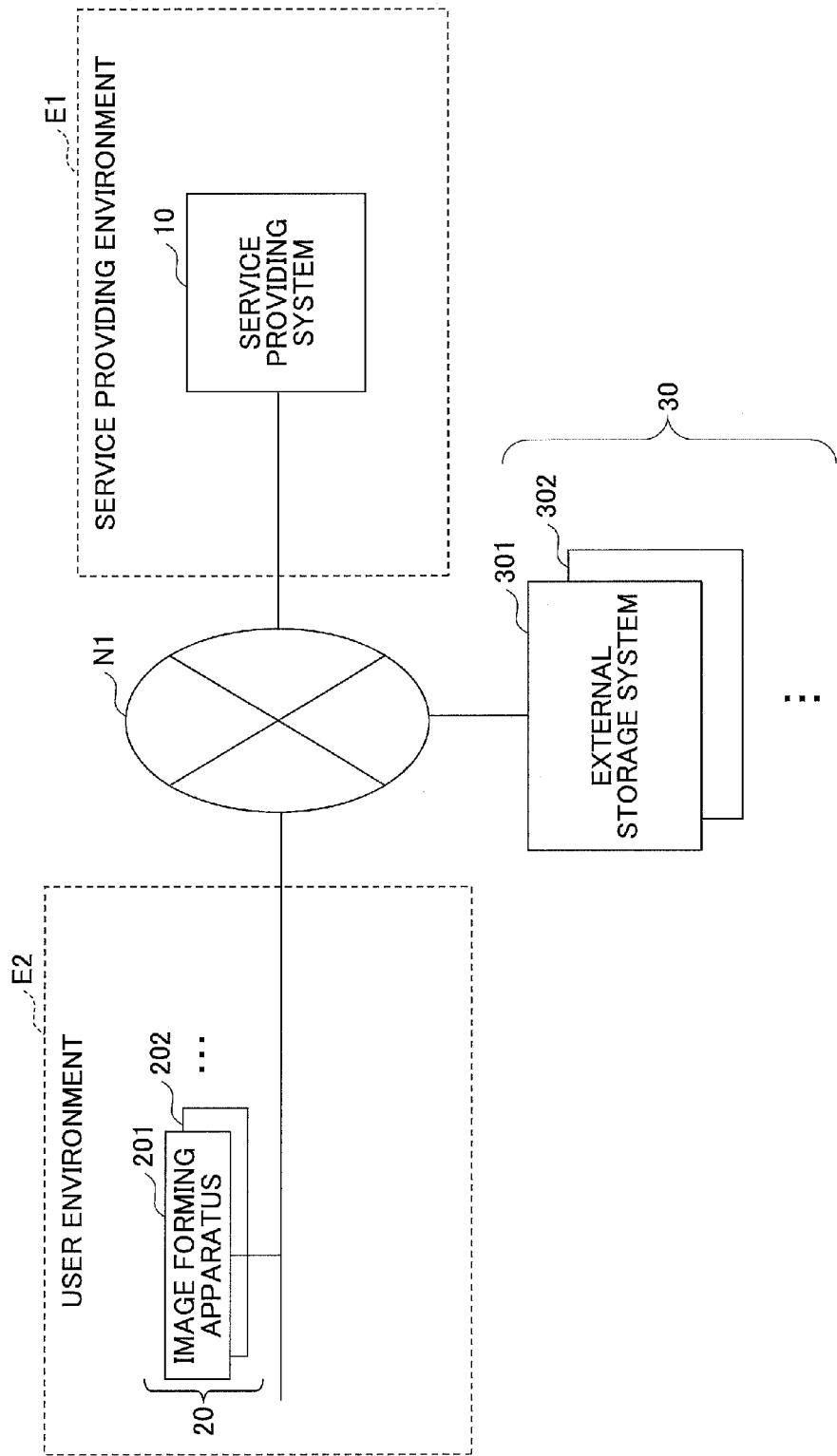
FIG. 1 is a diagram illustrating a system structure of an exemplary information processing system of a first embodiment.

Referring to FIG. 1, an information processing system 1 of a first embodiment is described. FIG. 1 is a diagram illustrating a system structure of an exemplary information processing system of the first embodiment.

The information processing system 1 illustrated in FIG. 1 includes a service providing environment E1, a user environment E2, and an external storage system 30, and is communicably coupled through a wide area network N1 such as the Internet.

The service providing environment E1 is a system environment which provides an external service such as a cloud service through the network N1. Within the first embodiment, the cloud service is adopted for description as a specific example of the external service. However, the first embodiment can be applied to a service provided through the network such as a service provided by an application service provider (ASP), a web service, and so on.

The service providing environment E1 includes a service providing system 10 implemented by at least one information processing apparatus. The service providing system 10 provides a predetermined service through the network N1.

For example, the service providing system 10 provides a service (a scan delivery service), in which an electronic file generated by scanning an original in the image forming apparatus 20 of the user environment E2 is subjected to an optical character reader (OCR) process, is subjected to a translating process of language, and is stored in the external storage system 30. In the first embodiment, such a service is called "scan delivery service". The service providing system 10 provides a scan delivery service.

However, a service provided by the service providing system 10 is not limited to the scan delivery service. Further, for example, the service providing system 10 may provide a service of printing the electronic file, which is stored in the external storage system 30, using the image forming apparatus 20 of the user environment E2. Further, for example, the service providing system 10 may provides a service of projecting the electronic file, which is stored in the external storage system 30, using a scanner of the user environment E2.

All or a part of the service providing system 10 may be installed in the user environment E2. Said differently, all or a part of the information processing apparatus forming the service providing system 10 may be included in the user environment E2.

The user environment E2 is, for example, a system environment in a company such as a user using the image forming apparatus 20. To the user environment E2, at least one image forming apparatuses 20 is coupled through a network such as a local area network (LAN) or the like.

The image forming apparatus 20 of the first embodiment is a multifunction peripheral (MFP) having a scan function. The image forming apparatus 20 may have a print function, a copy function, a facsimile (fax) communication function, or the like in addition to the scan function.

The external storage system 30 is a computer system providing a cloud service called a storage service or an online storage through the network N1.

The storage service is a service of lending a memory area of a storage of the external storage system 30. Within the first embodiment, in the scan delivery service, the electronic file undergoing the OCR process and the translating process is stored (uploaded) in the memory area lent by the external storage system 30.

Hereinafter, when each of multiple external storage systems 30 is distinguished, it is referred to as an "external storage system 301", an "external storage system 302", or the like. Further, the name of the service provided by the external storage system 301 is referred to as a "storage service A", and the service name provided by the external storage system 302 is referred to as a "storage service B".

The external storage system 30 may be a system formed by multiple information processing apparatuses. The structure of the information processing system 1 illustrated in FIG. 1 is an example and may be another structure. For example, as described above, the user environment E2 may include various apparatuses such as a projector and an electronic blackboard in addition to or in place of the image forming apparatus 20.

<Hardware Structure>
<<Service Providing System>>

Figure 2:
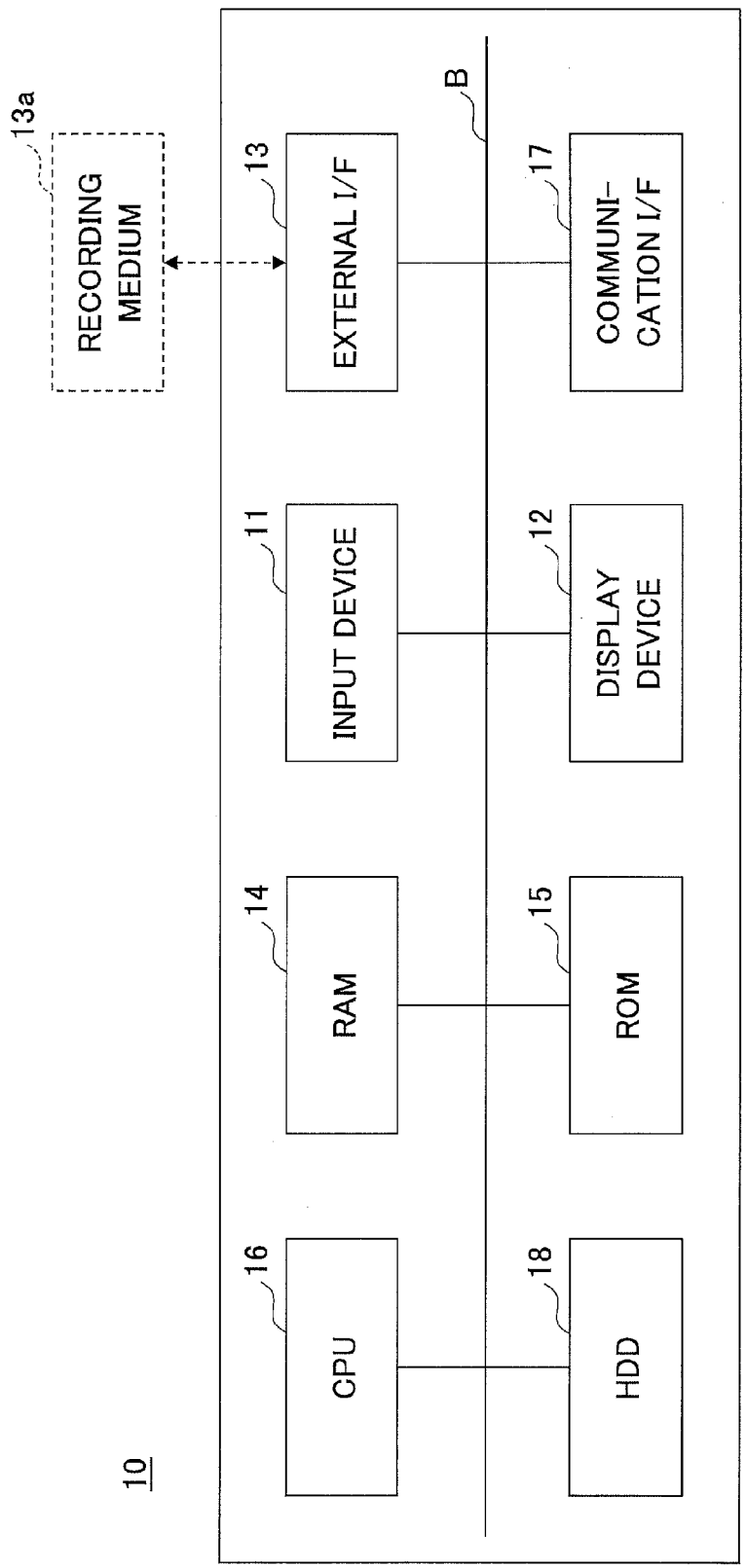
FIG. 2 is a diagram illustrating a hardware structure of an exemplary service providing system of the first embodiment.

Referring to FIG. 2, a hardware structure of a service providing system 10 is described. FIG. 2 is a diagram illustrating a hardware structure of an exemplary service providing system of the first embodiment.

The service providing system 10 illustrated in FIG. 2 includes an input device 11, a display device 12, an external interface (I/F), and a random access memory (RAM) 14. Further, the service providing system 10 includes a read only memory (ROM) 15, a central processing unit (CPU) 16, a communication I/F 17, and a hard disk drive (HDD) 18. These hardware apparatuses are coupled by a bus B.

The input device 11 includes a keyboard, a mouse, a touch panel, and the like, by which a user input various operation signals. The display device 12 includes a display or the like to display a processed result acquired by the service providing system 10. It is acceptable to provide a structure such that the input device 11 and the display device 12 may be coupled to the bus B when preferred so.

The communication I/F 17 is an interface provided to couple the service providing system 10 with the network N1. Thus, the service providing system 10 can perform data communications with another apparatus through the communication I/F 17.

The HDD 18 is a non-volatile memory device that stores programs and data. The stored program and data are an operating system (OS), which is basic software controlling the entire service providing system 10, application software providing various functions in the OS, and so on.

The service providing system 10 may use a drive device using a flash memory (e.g., a solid state drive (SSD)) as a memory medium in place of the HDD 108. Further, the HDD 108 administers the stored program and the stored data using at least one of a predetermined file system and a predetermined database (DB).

The external I/F 13 is an interface with an external apparatus. The external apparatus includes a recording medium 13a and so on. With this, the service providing system 10 can read information from the recording medium 13a or write the information to the recording medium 13a through the external I/F 13. The recording medium 13a is a flexible disk, a CD, a DVD, an SD memory card, a USB memory, or the like.

The ROM 15 is a non-volatile semiconductor memory (a memory device), which can hold a program and data even when a power source is powered off. The ROM 15 stores a program and data such as a basic input/output system (BIOS), an operating system (OS) setup, a network setup, or the like, which are executed at a time of starting up the service providing system 10. The RAM 14 is a volatile semiconductor memory temporarily storing the program or the data.

The CPU 16 reads the program or the data from the ROM 15, the HDD 18, or the like. The read program or the read data undergo a process to implement an overall control or a function of the entire service providing system 10.

The service providing system 10 of the first embodiment can implement various processes described below using the above hardware structure of the service providing system 10.

<<Image Forming Apparatus>>

Figure 3:
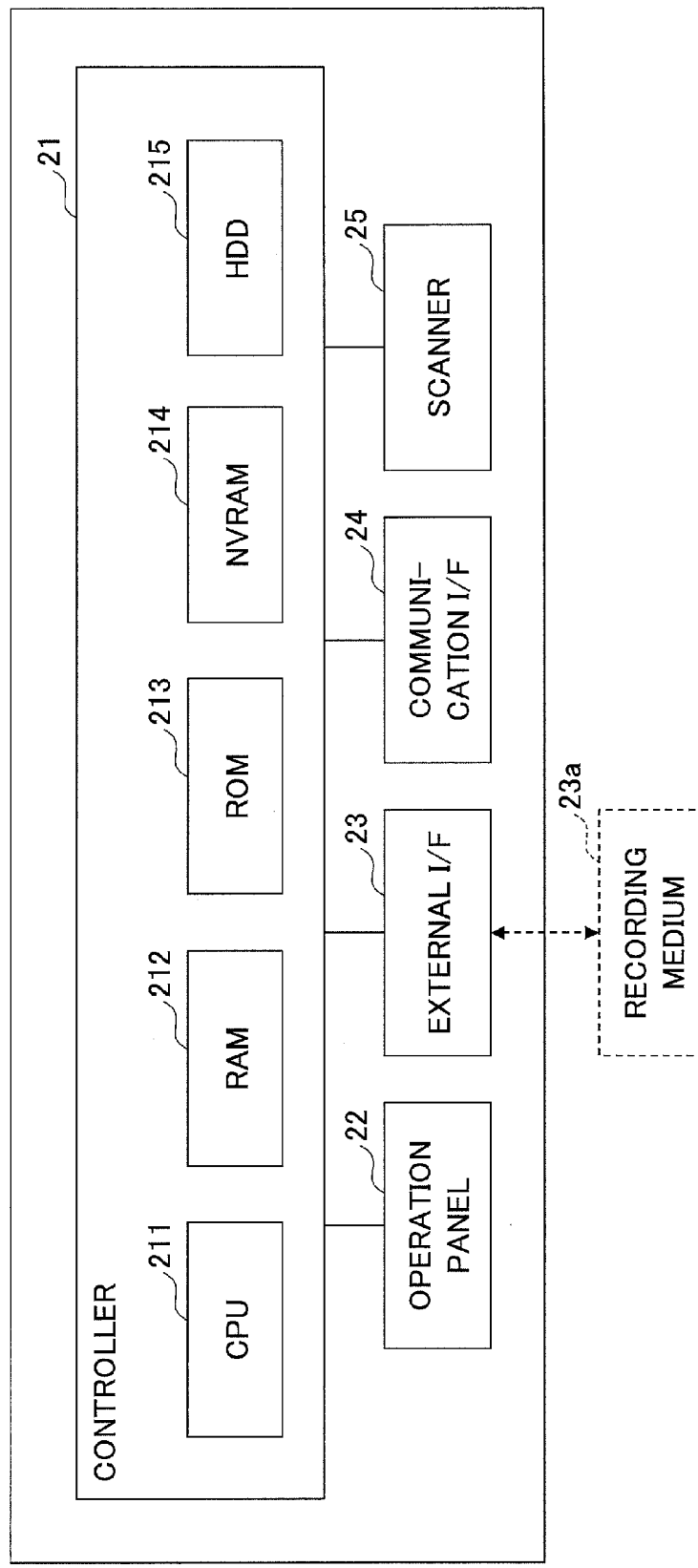
FIG. 3 is a diagram illustrating a hardware structure of an exemplary image forming apparatus of the first embodiment.

Referring to FIG. 3, the hardware structure of the image forming apparatus 20 is described. FIG. 3 is a diagram illustrating a hardware structure of an exemplary image forming apparatus of the first embodiment.

The image forming apparatus 20 illustrated in FIG. 3 includes a controller 21, an operation panel 22, an external I/F 23, a communication I/F 24, and a scanner 606. The controller 21 includes a CPU 211, a RAM 212, a ROM 213, an NVRAM 214, and an HDD 215.

Various programs and data are stored in the ROM 213. The RAM 212 temporarily stores the program and the data. Setup information or the like is stored in the NVRAM 214. Various programs and data are stored in the ROM 215.

The CPU 211 reads the program, the data, setup information, or the like into the RAM 212 from the ROM 213, the NVRAM 214, the HDD 215, or the like, and performs the process. Thus, the CPU 211 substantializes an entire control or functions of the image forming apparatus 20.

The operation panel 22 includes an input unit for receiving an input from the user and a display unit for a display. The external I/F 23 is an interface with an external apparatus. The external apparatus includes a recording medium 23a and so on. With this, the image forming apparatus 20 can read information from the recording medium 23a or write the information to the recording medium 23a through the external I/F 23. The recording medium 23a is an IC card, a flexible disk, a CD, a DVD, an SD memory card, a USB memory, or the like.

The communication I/F 24 is an interface provided to couple the image forming apparatus 20 with the network N1. Thus, the image forming apparatus 20 can perform data communications with another apparatus through the communication I/F 24. The scanner 25 is a reading apparatus which reads the original and generates an image file (an electronic file).

The image forming apparatus 20 of the first embodiment can perform various processes described below with the above hardware structure.

<Software Structure>

Figure 4:
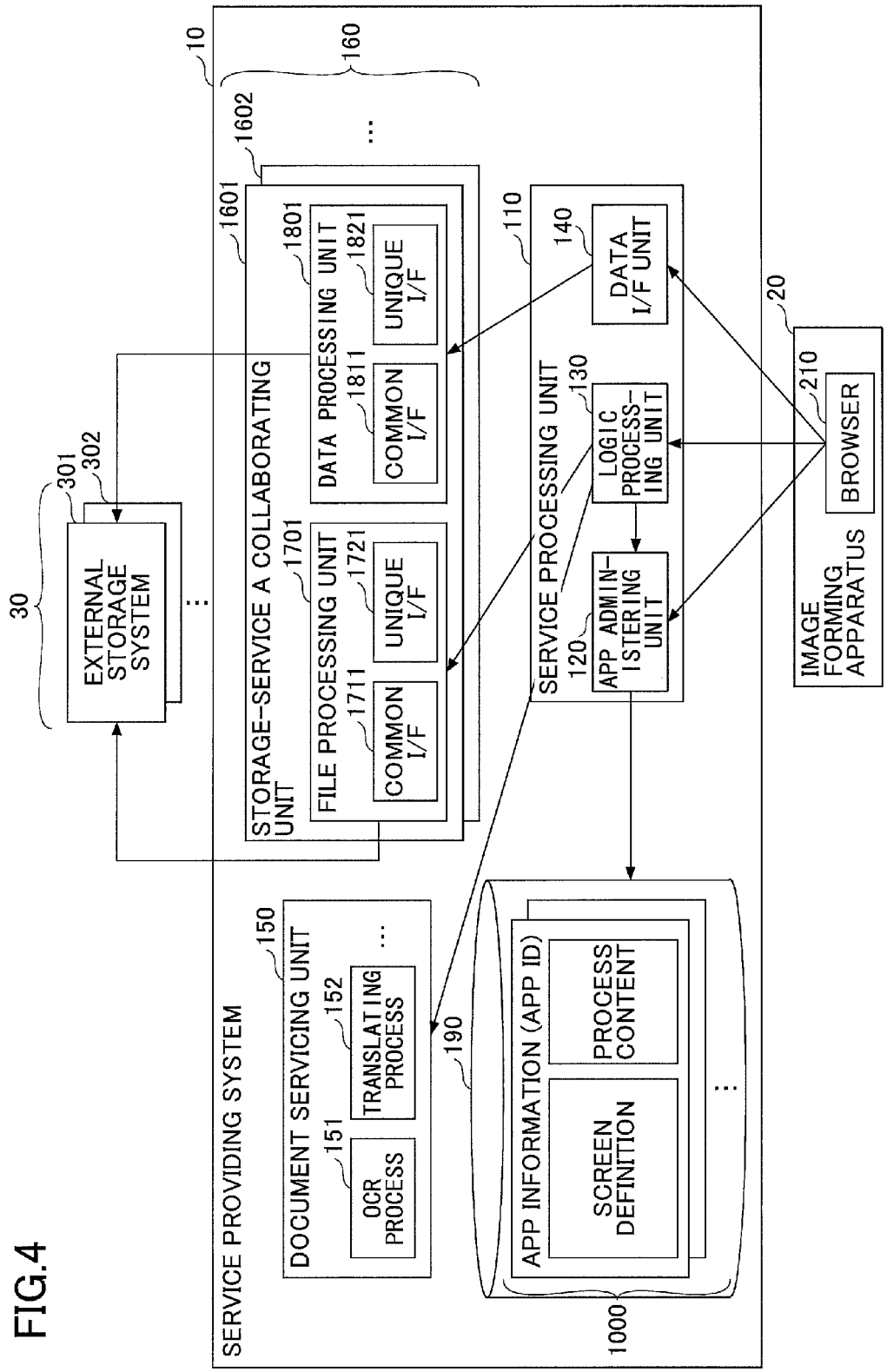
FIG. 4 is a processing block diagram illustrating an exemplary information processing system of the first embodiment.

Referring to FIG. 4, the information processing system 1 of the first embodiment is described. FIG. 4 is a processing block diagram illustrating an exemplary information processing system of the first embodiment.

Referring to FIG. 4, the image forming apparatus 20 includes a browser 210 implemented by, for example, the CPU 211. The user of the image forming apparatus 20 can use a service provided by the service providing system 10 through the browser 210. As such, the browser 210 may be installed on the image forming apparatus 20. Within the information processing system 1 of the first embodiment, a dedicated application, which is to be used by the image forming apparatus 20, is not developed.

The service providing system 10 illustrated in FIG. 4 includes a service processing unit 110, a document servicing unit 150, and a storage-service collaborating unit 160. These units are implemented when one or more programs installed on the service providing system 10 are executed by the CPU 16.

Further, the service providing system 10 includes an application information memory unit 190. The application (app) information memory unit 190 can be implemented by the HDD 18. The app information memory unit 190 can be implemented by a memory device or the like coupled to the service providing system 10 through the network.

The service processing unit 110 performs a process related to various services in response to a request from the browser 210 of the image forming apparatus 20. The service processing unit 110 includes an app administering unit 120, a logic processing unit 130, and a data I/F unit 140.

An application (app) administering unit 120 administers application information 1000 stored in an app information memory unit 190. The app administering unit 120 returns an app screen formed based on a screen definition included in the app information 1000 in response to a request from the browser 210. With this, the app screen for using a service provided by the service providing system 10 is displayed on the operation panel 22 by the browser 210 of the image forming apparatus 20.

The app information 1000 includes screen definition for causing the image forming apparatus 20 to display the app screen and a process content for substantializing a service used from the app screen. The app information 1000 may include multiple screen definitions and multiple process contents.

Further, the application administering unit 120 returns the process content included in the app information 1000 in response to a request from the logic process unit 130. The process content describes a sequence of processes (hereinafter, referred to as a "process flow" for sustantializing the service provided by the service providing system 10.

The logic processing unit 130 acquires the process content from the app administering unit 120 in response to a request received from the browser 210. The logic processing unit 130 executes the sequence of processes based on the acquired process content.

Said differently, the logic processing unit 130 requests at least one of the document servicing unit 150 and the file processing unit 170 of the storage-service collaborating unit 160 to execute the process in conformity with the process content, and the sequence of processes are executed based on the process content. With this, the service providing system 10 of the first embodiment can provides various services to the image forming apparatus. A detailed processing block of the logic processing unit 130 is described later.

The data I/F unit 140 sends a predetermined request (for example, a request to acquire a folder view) to a data processing unit 180 of the storage-service collaborating unit 160 in response to a request received from the browser 210.

The document servicing unit 150 is a program (module) group substantializing a service provided by the service providing system 10. The document servicing unit 150 includes a program for an optical character reader (OCR) process 151 of performing an OCR process to an electronic file and a program for a translating process 152 of translating a document file (an electronic file) described in a predetermined language to another predetermined language.

The document servicing unit 150 may include various programs in addition to or in place of the above programs. For example, the document servicing unit 150 may include a program of converting the electronic file to have a data format (print data) which can be printed by the image forming apparatus 20 and a program of compressing or decompressing the electronic file.

The storage-service collaborating unit 160 requests the external storage system 30 to execute various processes in response to a request received from the logic processing unit 130 or the data I/F unit 140.

Here, the service providing system 10 includes the storage-service collaborating units 160 respectively for the external storage systems 30. Said differently, the service providing system 10 includes a storage-service A collaborating unit 1601 for requesting an external storage system 301 to process and a storage-service B collaborating unit 1602 for requesting an external storage system 302 to process. As such, the service providing system 10 includes the storage-service collaborating units 160, which respectively correspond to the external storage systems 30 processing in collaboration with the service providing system 10.

Hereinafter, the multiple storage-service collaborating units 160 are individually distinguished by a "storage-service A collaborating unit 1601", a "storage-service B collaborating unit 1602", and so on when preferred so.

As described, the storage-service collaborating unit 160 includes the file processing unit 170 of receiving the request from the logic processing unit 130 and the data processing unit 180 of receiving the request from the data I/F unit 140.

The file processing unit 170 includes a common I/F 171 and a unique I/F 172, in which an application programming interface (API) for conducting an operation (e.g., an acquisition, a storage, and an edit) to the electronic file stored in the external storage system 30 is defined.

The common I/F 171 is an API used among the multiple external storage systems in common as, for example, the API illustrated in FIG. 5A. Said differently, the common I/Fs 171 of the file processing units 170 are API groups for using a function (e.g., a file acquisition, a file storage, or the like) related to a file operation and can be used by all the external storage systems 30.

On the other hand, the unique I/F 172 is an API used by a specific external storage system 30 as, for example, the API illustrated in FIG. 5B. Said differently, the unique I/F 172 of the file processing unit 170 is an API group for using a function (e.g., a file edit or the like) related to the file operation and can be used by a specific external storage system 30.

Therefore, the common I/Fs 171 are similarly defined with respect to all the storage-service collaborating units 160. Meanwhile, the unique I/F 172 is individually defined with respect to the specific storage-service collaborating unit 160, in which the API defined by the unique I/F 172 can be used.

On the other hand, the data processing unit 180 includes a common I/F 181 and a unique I/F 182, in which an API for acquiring meta data (e.g., an file view, a folder view, or the like) of bibliographic information of the electronic file stored in the external storage system 30 is defined.

The common I/Fs 181 are APIs used among the multiple external storage systems 30 in common as, for example, the API illustrated in FIG. 5C. Said differently, the common I/Fs 181 of the data processing units 180 is API groups for using a function of a meta data acquisition, which can be used by all the external storage systems 30.

On the other hand, the unique I/F 182 is an API used by a specific external storage system 30 as, for example, the API illustrated in FIG. 5D. Said differently, the unique I/F 182 of the data processing unit 180 is an API group for using a function of metadata acquisition (e.g., acquisition of an image file view), which can be used by a specific external storage system 30.

Therefore, the common I/Fs 181 are similarly defined with respect to all the storage-service collaborating units 160. Meanwhile, the unique I/F 182 is individually defined with respect to the specific storage-service collaborating unit 160, in which the API defined by the unique I/F 182 can be used.

As described, the service providing system 10 includes the storage-service collaborating units 160 respectively corresponding to the external storage systems 30, which respectively process in collaboration with the storage-service collaborating unit 160. Therefore, in a case where the external storage system 30 to be a collaboration destination is added, the storage-service collaborating unit 160 corresponding to the external storage system 30 may be added to the service providing system 10.

Therefore, in the service providing system 10 of the first embodiment, an influence caused by adding the external storage system 30 to be the collaboration destination can be localized. Said differently, without influencing another processing block (the service processing unit 110, the document servicing unit 150, or the like)(without a need of modifying the other processing block), the external storage system 30 to be the collaboration destination can be added.

Therefore, in the service providing system 10 of the first embodiment, the man-hour for development caused by adding the external storage system 30 to be the collaboration destination can be reduced. Here, a software development kit (SDK) may be used to add the storage-service collaborating unit 160.

In the storage-service collaborating unit 160, the common I/F 171 and the unique I/F 172 are respectively implemented by different modules. Further, the API defined by the common I/F and the unique I/F can be used by designating a "storage service name" (an external service name). Said differently, the "storage service name" (the external service name) is a variable portion in the common I/F and the unique I/F.

Therefore, if the external storage system 30 to be the collaboration destination is added, it is possible to reuse the common I/F 171 defined in another storage-service collaborating unit 160. Said differently, in a case where the external storage system 30 of the collaboration destination is added, only the unique I/F 172 of the external storage system 30 to be added may be developed. Therefore, in the service providing system 10 of the first embodiment, the man-hour for the development caused by adding the external storage system 30 to be the collaboration destination can be further reduced. The above merits in the common I/F 171 and the unique I/F 172 are similarly applicable to the common I/F and the unique I/F 182 of the data processing unit 180.

The app information memory unit 190 stores app information 1000. The app information 1000 includes a screen definition causing the image forming apparatus 20 to display the app screen and a process content describing a content of a sequence of processes substantializing a service, which is used from the app screen. An app ID for uniquely identifying the app information 1000 is given to the app information 1000.

Here, the app ID of the app information 1000 for providing the scan delivery service of the first embodiment is "app001". Further, the app information 1000 of the app ID "app001" includes process content 1100 for substantializing the scan delivery service in collaboration with the storage service A and process content 1200 for substantializing the scan delivery service in collaboration with the storage service B.

Referring to FIGS. 6A and 6B, the process content 1100 for substantializing the scan delivery service in collaboration with the storage service A and the process content 1200 for substantializing the scan delivery service in collaboration with the storage service B are described. FIGS. 6A and 6B illustrate exemplary process contents of the first embodiment.

The process content 1100 illustrated in FIG. 6A includes a flow ID definition part 1101 and a process definition part 1102. In the flow ID definition part 1101, an app ID "app001" and a flow ID "flow001", which uniquely identify the process content 1100, are described.

The process definition part 1102 describes a content of a sequence of processes for substantializing the scan delivery service in collaboration with the storage service A. Said differently, the process content 1100 illustrated in FIG. 6A describes the sequence of processes of providing the OCR process to the electronic file generated by scanning, thereafter providing the translating process to the above, and storing the translation in the external storage system 301.

In a manner similar to the above, the process content 1200 illustrated in FIG. 6B includes a flow ID definition part 1201 and a process definition part 1202. In the flow ID definition part 1201, a flow ID "flow002" uniquely identifying the process content 1200 is described.

The process definition part 1202 describes a content of a sequence of processes for substantializing the scan delivery service in collaboration with the storage service B. Said differently, the process content 1200 illustrated in FIG. 6B describes the sequence of processes of providing the OCR process to the electronic file generated by scanning, thereafter providing the translating process to the above, and storing the translation in the external storage system 302.

The execution order of the processes defined in the process content 1100 illustrated in FIG. 6A and the process content 1200 illustrated in FIG. 6B is a sequence from up to down. Said differently, in the process content 1100 illustrated in FIG. 6A, the content of the processes described in the process definition part 1102 is performed beginning at the top. In a manner similar to the above, the process content 1200 illustrated in FIG. 6B, the content of the processes described in the process definition part 1202 is performed beginning at the top. However, the first embodiment is not limited thereto. For example, the process content 1100 and the process content 1200 may define information indicative of the execution order of the processes included in the sequence of processes.

As described, the service providing system 10 of the first embodiment includes the app information 1000, including the screen definition for causing the image forming apparatus 20 to display the app screen and the process content describing the content of the sequence of processes (a process flow) for substantializing the service. With this, the service providing system 10 of the first embodiment can provides various services to the image forming apparatus 20. Therefore, in a case where a service provided by the service providing system 10 is added, the application information 1000 may be added to the app information memory unit 190.

Further, the screen definition and the process content may be described in order to add the app information 1000. Therefore, the development becomes easy. Therefore, a man-hour caused by an addition or a change of the service can be reduced, and the addition or the change of the service by, for example, a third vendor or the like can be easily conducted.

Figure 7:
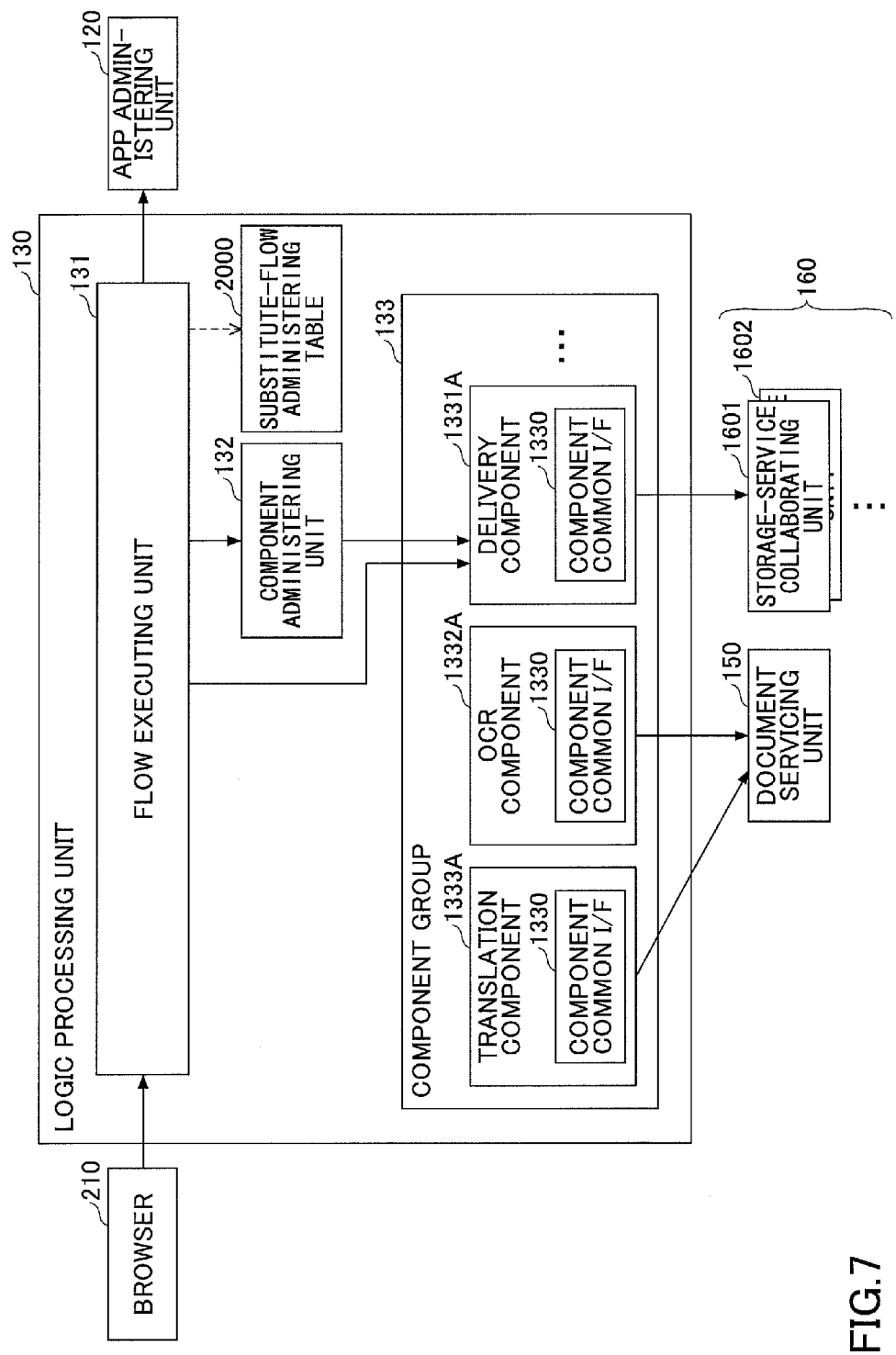
FIG. 7 is a processing block diagram of an exemplary logic processing unit of the first embodiment.

Next, referring to FIG. 7, a processing block of the logic processing unit 130 related to the first embodiment is described in detail. FIG. 7 is a processing block diagram of an exemplary logic processing unit of the first embodiment.

Referring to FIG. 7, the logic processing unit 130 includes a flow executing unit 131, a component administering unit 132, and a component group 133. The logic processing unit 130 uses a substitute-flow administering table 2000.

In receipt of a flow execution request to execute a flow for substantializing the service from a browser 210, the flow executing unit 131 acquires the process content corresponding to a flow identification (ID) included in the flow execution request through the app administering unit 120. Then, the flow executing unit 131 requests a component to execute the process in accordance with the acquired process content. Here, the component is a module or the like for executing one process from among the sequence of processes based on the process content, and is defined by, for example, a class, a function, or the like.

In a case where an error or the like occurs in the sequence of processes performed based on the process content, the flow executing unit 131 acquires a substitute flow ID from the substitute-flow administering table 2000. The flow executing unit 131 acquires the process content corresponding to the substitute flow ID through the app administering unit 120 to request the component to execute the process in accordance with the process content.

Here, the substitute flow ID is a flow ID of the process content (a substitute flow content) executed in a case where the error or the like occurs in the sequence of processes (the process flow) based on a certain process content. The substitute flow content describes the content of the process for acquiring a processed result similar to the processed result in the process flow.

Said differently, in a case where an error or the like occurs in the process flow, the flow executing unit 131 executes the sequence of processes (a substitute flow) based on the substitute flow content of the substitute flow ID associated with the flow ID of the process flow in the substitute-flow administering table 2000.

The component administering unit 132 generates the component in response to the request from the flow executing unit 131. Here, the generation of the component means that the component defined by, for example, the class is deployed on the memory (for example, the RAM 14).

The component group 133 is a set of the components. The component group 133 includes a delivery component 1331A for delivering an electronic file to the external storage system 301. The component group 133 includes an optical character recognition (OCR) component 1332A for providing an OCR process to the electronic file and a translation component 1333A for performing a translating process of translating the electronic file to a predetermined language.

The component group 133 includes a delivery component 1331B for delivering the electronic file to the external storage system 302. In a manner similar to the above, the component group 133 includes an OCR component 1332B different from the above OCR component 1332A and a translation component 1333B different from the above translation component 1333A. As described, various components executing various processes are included in the component group 133.

Each component included in the component group 133 includes a component common I/F 1330. The component common I/F 1330 is an application programming interface (API) defined for each component in common, and includes an API for generating the component and an API for requesting the component to execute the process.

As described, it is possible to localize an influence caused by the addition of the component when each component has the component common interface (I/F) 1330. Said differently, the component can be added without influencing the flow executing unit 131 and the component administering unit 132. With this, the man-hour for the development of the addition of the component can be reduced.

Here, referring to FIG. 8, the substitute-flow administering table 2000 is described. FIG. 8 illustrates an exemplary substitute-flow administering table of the first embodiment.

The data items of the substitute-flow administering table 2000 illustrated in FIG. 8 include a flow ID and a substitute flow ID. Said differently, in the substitute-flow administering table 2000, the substitute flow ID is associated with the flow ID.

For example, the substitute flow ID "flow002" is associated with the flow ID "flow001". With this, in a case where an error or the like occurs in the sequence of processes based on the process content of the flow ID "flow001", it is possible to acquire the process content of the substitute flow ID "flow002" associated with the flow ID.

<Detailed Process>

Described next is a detailed process of the information processing system of the first embodiment.

<<Overall Process of Scan Delivery Service>>

Figure 9:
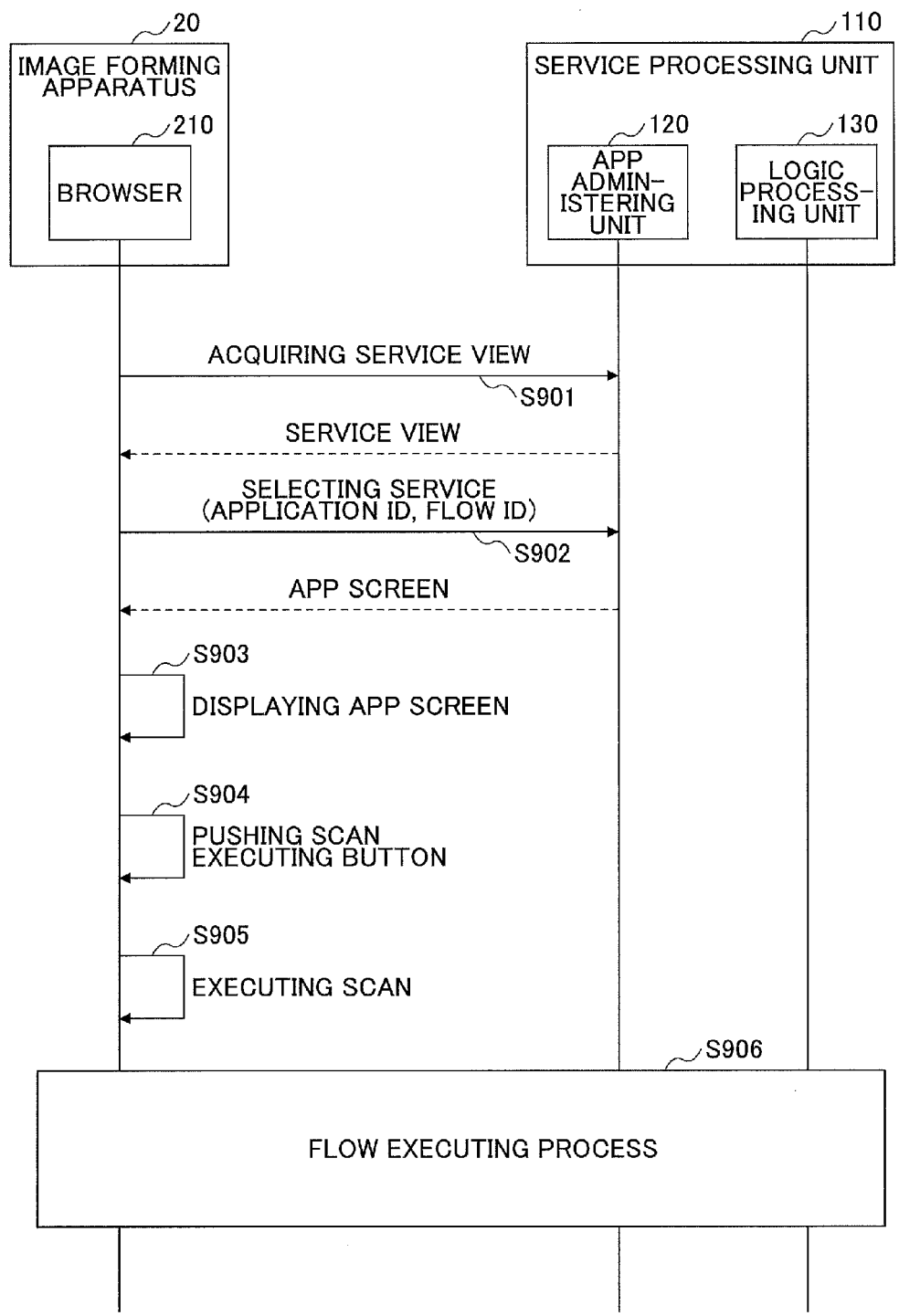
FIG. 9 is a sequence diagram of an exemplary overall process of a scan delivery service of the first embodiment.

Described first is an overall process in a case where a user of an image forming apparatus 20 uses the scan delivery service of the first embodiment is described. FIG. 9 is a sequence diagram of an exemplary overall process of the scan delivery service of the first embodiment.

At first, the user of the image forming apparatus 20 conducts an operation of acquiring a service view provided by the service providing system 10 by using the browser 210. The image forming apparatus 20 sends a service view acquisition request of requesting the service providing system 10 to acquire a service view (Step S901). When the app administering unit 120 of the service processing unit 110 receives the acquisition request, the app administering unit 120 sends the service view provided by the service providing system 10 to the image forming apparatus 20.

With this, the service view of a service provided by the service providing system 10 is displayed on the operation panel 22 by the browser 210 of the image forming apparatus 20. The service view includes a service name provided by the service providing system 10, an app ID of the app information 1000 for providing the service, and a flow ID of the process content substantializing this service.

The user selects the service requested to be used by the user from the service view displayed on the operation panel 22 of the image forming apparatus 20. Then, the browser 210 sends the app ID of the app information 1000 for providing the selected service and the flow ID of the process content substantializing the service to the app administering unit 120 (step S902).

Here, the user selects a use of a service "Scan to storage service A" for scan delivery in collaboration with the storage service A. Therefore, the browser 210 sends the app ID "app001" of the app information 1000 providing the scan delivery service and the flow ID "flow001" of the process content 1100 included in the app information 1000 to the app administering unit 120.

Then, the app administering unit 120 generates the app screen in the HyperText Markup Language (HTML) format based on the screen definition included in the app information 1000 having the app ID received from the browser 210 and sends the generated app screen to the browser 210.

Figure 10:
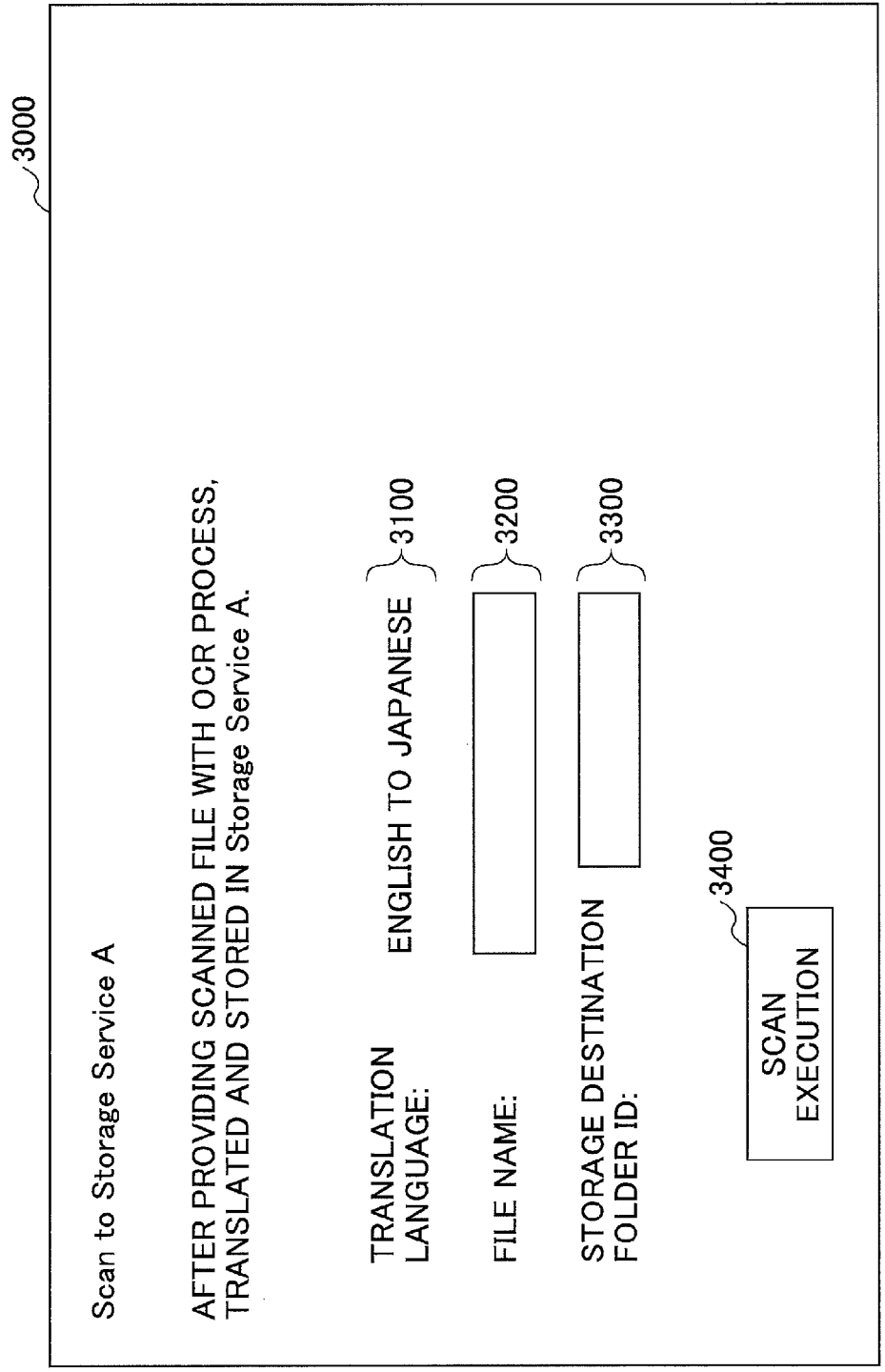
FIG. 10 illustrates an exemplary application screen for using a scan delivery service.

When the app screen is received from the app administering unit 120, the browser 210 causes the operation panel 22 to display, for example, the app screen 3000 illustrated in FIG. 10 (step S903). FIG. 10 illustrates an exemplary app screen for using the scan delivery service.

Next, the user inputs a preferred file name given to an electronic file generated by scanning into a file-name input column 3200 of the app screen 3000 illustrated in FIG. 10. The user inputs the folder ID of the folder of the storage service A, in which the electronic file generated by scanning is stored, into a storage-destination-folder-ID input column 3300. Although a translation language column 3100 of the app screen 3000 illustrated in FIG. 10 displays "English to Japanese" indicative of translation from English to Japanese, the user may select the language of translation source and the language of translation destination.

In the app screen illustrated in FIG. 10, the user directly inputs the folder ID of the storage destination folder in the storage service A. However, the user may select the storage destination folder from the folder view. Said differently, for example, the data I/F unit 140 acquires the folder view of the storage service A through a data processing unit 180 to enable the user to select the storage destination folder from among the acquired folder view.

Then, the user sets the original manuscript onto the scanner 25 of the image forming apparatus 20 and pushes a scan execution button 3400 (step S904). By this, the original is read by the scanner 25 of the image forming apparatus 20 and an electronic file having a file name input into the file-name input column 3200 is generated (step S905).

Subsequently, the service providing system 10 provides the electronic file generated by the image forming apparatus 20 with an OCR process, translates the language, and delivers the translation to the storage service A to perform a flow execution process (step S906). The flow execution process is described in detail later.

<<Flow Execution Process>>

Figure 11:
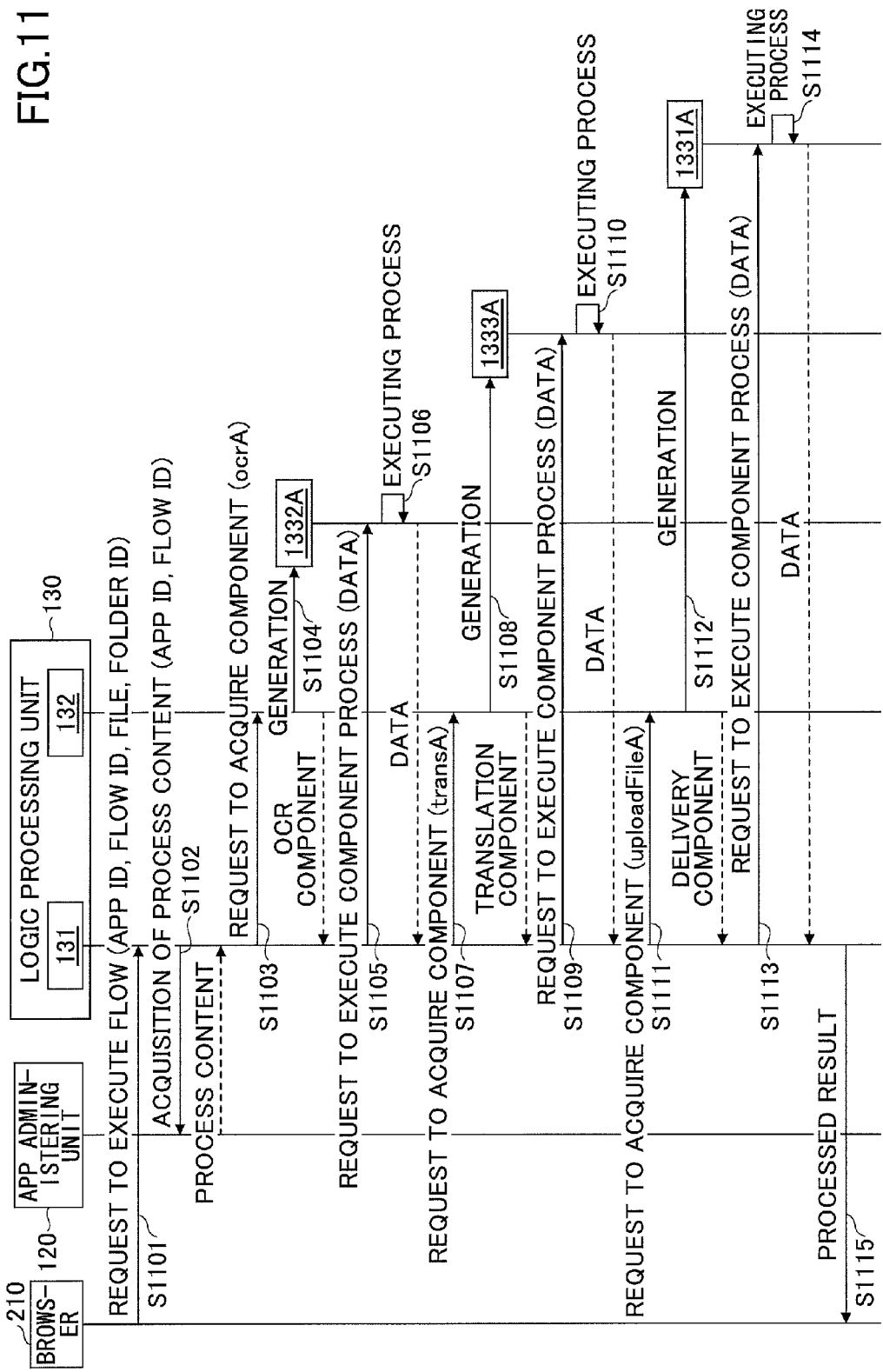
FIG. 11 is a sequence chart of an exemplary flow execution process of the first embodiment.

Hereinafter, the flow execution process in step S906 is described in detail. Referring to FIG. 11, a case where the flow execution process is normally executed is explained. FIG. 11 is a sequence chart of an exemplary flow execution process of the first embodiment.

At first, the browser 210 sends the flow execution request for substantializing the scan delivery service to the flow executing unit 131 (step S1101). Here, this flow execution request includes the app ID "app001" of the app information 1000 for providing the scan delivery service and the flow ID "flow001" of the process content for substantializing the scan delivery service in collaboration with the storage service A. Further, the flow execution request includes the electronic file generated by scanning and the folder ID of the storage destination folder of the electronic file in the external storage system 301.

Next, in receipt of the flow execution request, the flow executing unit 131 acquires the process content of the flow ID "flow001" from the app information 1000 of the app ID "app001" included in the flow execution request through the app administering unit 120 (step S1102). Said differently, the flow executing unit 131 acquires the process content 1100 illustrated in FIG. 6A.

The flow execution unit 131 requests the component administering unit 132 to acquire the component in accordance with the acquired process content (step S1103). More specifically, the flow executing unit 131 requests the component administering unit 132 to acquire the OCR component 1332A based on ".to("process:ocrA")" designated next to "From("file:input")" of the process content illustrated in FIG. 6A.

When the component administering unit 132 receives the acquisition request to acquire the OCR component 1332A, the component administering unit 132 generates the OCR component 1332A (step S1104). The OCR component 1332A is generated by using an API for generating a component defined in the component common I/F 1330.

When the OCR component 1332A is generated, the component administering unit 132 returns an OCR component 1332A to the flow executing unit 131. For example, the component administering unit 132 returns the address in the memory (e.g., the RAM 14), on which the OCR component 1332A is deployed, to the flow executing unit 131.

The flow executing unit 131 designates data and requests the generated OCR component 1332A to execute the process (step S1105). The data type of the designated data is "InputStream". The designated data is an electronic file transferred from the browser 210.

Said differently, the flow executing unit 131 requests to execute the process by transferring the electronic file, which is transferred as the data type of "InputStream" from the browser 210, simply as "data" (without convincing the data type) to the OCR component 1332. Referring to FIG. 11, this electronic file transferred without convincing the data type is simply indicated as the "data".

When the OCR component 1332A receives the execution request of the process, in which the data are designated, the OCR component 1332A executes the process to the designated data (step S1106). More specifically, the OCR component 1332A requests the OCR process 151 of the document servicing unit 150 to process, and the OCR process is executed for the data for which the OCR process is designated.

The OCR component 1332A returns data indicative of the electronic file provided with the OCR process to the flow executing unit 131.

Next, the flow executing unit 131 requests the component administering unit 132 to acquire the component in accordance with the acquired process content (step S1107). More specifically, the flow executing unit 131 requests the component administering unit 132 to acquire the translation component 1333A based on ".to("process:transA")" designated next to ".to("process:ocrA")" of the process content 1100 illustrated in FIG. 6A.

When the component administering unit 132 receives the acquisition request to acquire a translation component 1333A, the component administering unit 132 generates the translation component 1333A (step S1108). The translation component 1333A is generated by using the API for generating the component defined in the component common I/F 1333.

When the translation component 1333A is generated, the component administering unit 132 returns the translation component 1333A to the flow executing unit 131. For example, the component administering unit 132 returns the address in the memory (e.g., the RAM 14), on which the translation component 1333A is deployed, to the flow executing unit 131.

The flow executing unit 131 designates data and requests the generated translation component 1333A to execute the process (step S1109). The data designated here is the electronic file provided with the OCR process.

When the translation component 1333A receives the execution request of the process, in which the data are designated, the translation component 1333A executes the process to the designated data (step S1110). More specifically, the translation component 1333A requests the translating process 152 of the document servicing unit 150 to process and executes a translating process to a predetermined language for the data designated by the translating process 152.

The translation component 1333A returns data indicative of the electronic file provided with the translating process to the flow executing unit 131.

Next, the flow executing unit 131 requests the component administering unit 132 to acquire the component in accordance with the acquired process content 1100 (step S1111). More specifically, the flow executing unit 131 requests the component administering unit 132 to acquire the delivery component 1331A based on ".to("storage:uploadFileA")" designated next to ".to("process:transA")" of the process content 1100 illustrated in FIG. 6A.

When the component administering unit 132 receives the acquisition request to acquire the delivery component 1331A, the component administering unit 132 generates the delivery component 1331A (step S1112). The delivery component 1331A is generated by using the API for generating the component defined in the component common I/F 1330.

When the delivery component 1331A is generated, the component administering unit 132 returns delivery component 1331A to the flow executing unit 131. For example, the component administering unit 132 may return the address in the memory (e.g., the RAM 14), on which the delivery component 1331A is deployed, to the flow executing unit 131.

The flow executing unit 131 designates data and requests the generated delivery component 1331A to execute the process (step S1113). The data designated here is the electronic file provided with the translating process.

When the delivery component 1331A receives the execution request of the process, in which the data are designated, the delivery component 1331A executes the process to the designated data (step S1114). Said differently, the delivery component 1331A requests to execute the delivery of the data to a file processing unit 1701 of a storage-service A collaborating unit 1601 using an API for file storage defined as a common I/F 1711. Said differently, within the first embodiment, the delivery component 1331A requests the file processing unit 1701 of the storage-service A collaborating unit 1601 to perform the delivery execution of the data using the API of "service-a/process/folder" illustrated in FIG. 5A. With this, the electronic file provided with the translating process is stored in the folder of the folder ID input in the storage-destination-folder-ID input column 3300 illustrated in FIG. 10 in the storage service A.

The delivery component 1331A returns the data indicative of the executed result of the delivery execution to the flow executing unit 131.

The flow executing unit 131 returns the processed result of a sequence of processes (the process flow) 131 acquired based on the acquired process content 1100 to the browser 210 (step S1115). With this, the user of the image forming apparatus 20 can know that the sequence of processes substantializing the scan delivery service is completed.

Figure 12:
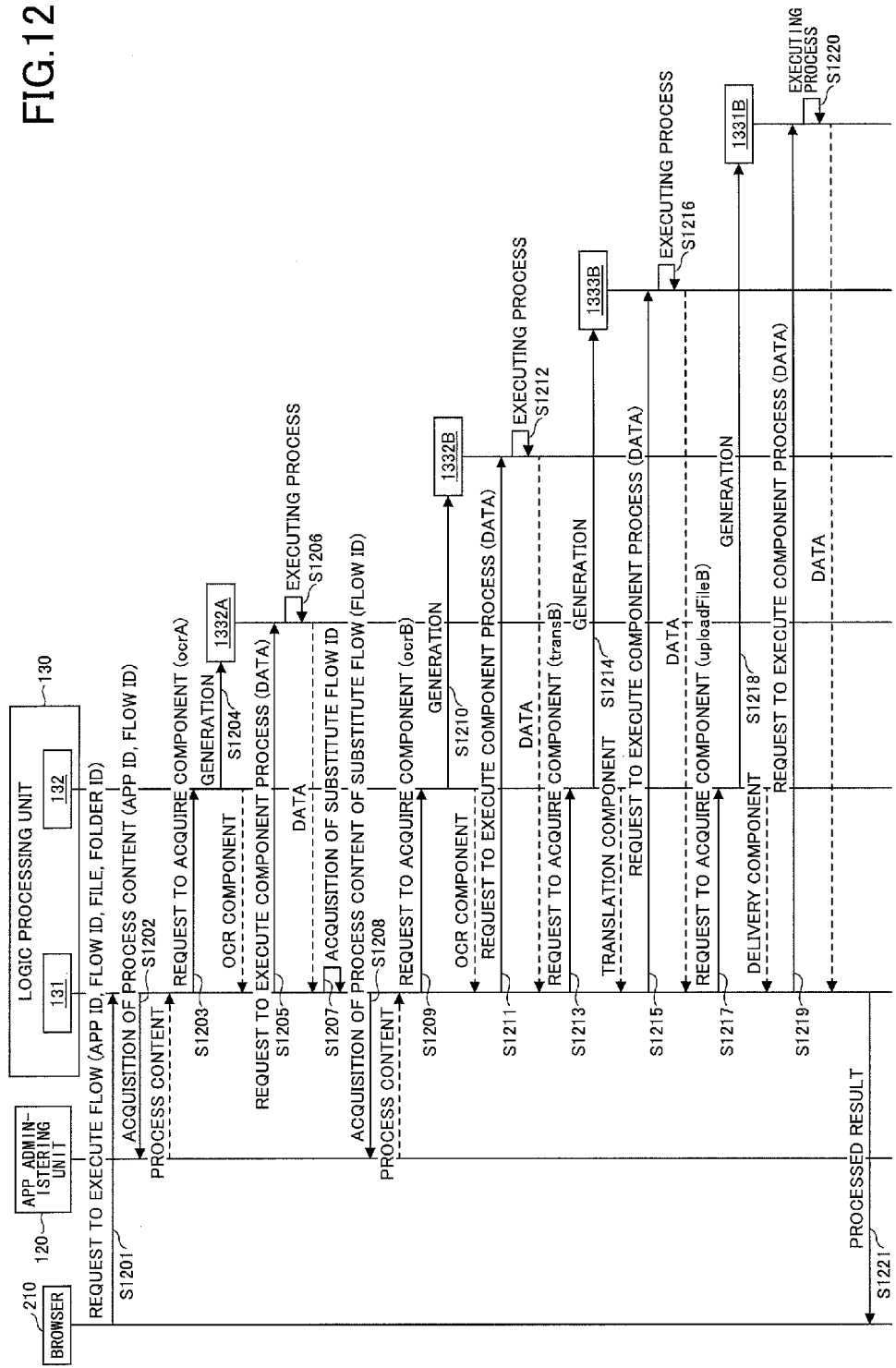
FIG. 12 is a sequence chart of another exemplary flow execution process of the first embodiment.

Referring to FIG. 12, described next is a case where an error occurs during a flow execution process. FIG. 12 is a sequence chart of another exemplary flow execution process of the first embodiment. Hereinafter, described is a case where an error occurs in the OCR process included in the sequence of processes (the process flow) for substantializing the scan delivery service of the first embodiment. However, the point where the error occurs is not limited thereto. Even if the error occurs in any process from among the processes included in the process flow substantializing the scan delivery service, a process described below is similarly applicable.

At first, the browser 210 sends the flow execution request for substantializing the scan delivery service to the flow executing unit 131 (step S1201). Here, this flow execution request includes the app ID "app001" of the app information 1000 for providing the scan delivery service and the flow ID "flow001" of the process content for substantializing the scan delivery service in collaboration with the storage service A. Further, the flow execution request includes the electronic file generated by scanning and the folder ID of the storage destination folder of the electronic file in the external storage system 301.

Next, in receipt of the flow execution request, the flow executing unit 131 acquires the process content of the flow ID "flow001" from the app information 1000 of the app ID "app001" included in the flow execution request through the app administering unit 120 (step S1202). Said differently, the flow executing unit 131 acquires the process content 1100 illustrated in FIG. 6A.

The flow executing unit 131 requests the component administering unit 132 to acquire the component in accordance with the acquired process content 1100 (step S1203). More specifically, the flow executing unit 131 requests the component administering unit 132 to acquire the OCR component 1332A based on ".to("process:ocrA")" designated next to "From("file:input")" of the process content 1100 illustrated in FIG. 6A.

When the component administering unit 132 receives the acquisition request to acquire the OCR component 1332A, the component administering unit 132 generates the OCR component 1332A (step S1204). The OCR component 1332A is generated by using the API for generating the component defined in the component common I/F 1330.

When the OCR component 1332A is generated, the component administering unit 132 returns the OCR component 1332A to the flow executing unit 131. For example, the component administering unit 132 returns the address in the memory (e.g., the RAM 14), on which the OCR component 1332A is deployed, to the flow executing unit 131.

The flow executing unit 131 designates the data and requests the generated OCR component 1332A to execute the process (step S1205). The data type of the designated data is "InputStream". The designated data is the electronic file transferred from the browser 210.

When the OCR component 1332A receives the execution request of the process, in which the data are designated, the OCR component 1332A executes the process to the designated data (step S1206). More specifically, the OCR component 1332A requests the OCR process 151 of the document servicing unit 150 to process, and the OCR process is executed for the data for which the OCR process is designated.

Here, the error indicating that the OCR process is impossible hypothetically occurs during the process of the OCR component 1332A in step S1206. Then, the OCR component 1332A returns data indicating that the error occurs to the flow executing unit 131.

When the flow executing unit 131 receives data indicating that the error occurs, the flow executing unit 131 refers to the substitute-flow administering table 2000 and acquires a substitute flow ID associated with the flow ID of the process content 1100 acquired in step S1202 (step S1207). More specifically, the flow executing unit 131B acquires the substitute flow ID "flow002" associated with the flow ID "flow001" of the process content 1100 in the substitute-flow administering table 2000.

Next, after the flow executing unit 131B acquires the substitute flow ID, the flow executing unit 131 acquires the process content (a substitute flow content) of the substitute flow ID "flow002" through the app administering unit 120 (step S1208). Said differently, the flow executing unit 131 acquires the process content 1200 illustrated in FIG. 6B.

As described above, the service providing system 10 of the first embodiment acquires another process content associated with the process content in the substitute-flow administering table 2000 in a case where the error or the like occurs in the sequence of processes based on the process content.

The flow executing unit 131 requests the component administering unit 132 to acquire the component in accordance with the acquired process content 1200 (step S1209). More specifically, the flow executing unit 131 requests the component administering unit 132 to acquire an OCR component 1332B based on ".to("process:ocrB")" designated next to "From("file:input")" of the process content 1200 illustrated in FIG. 6B.

When the component administering unit 132 receives the acquisition request to acquire the OCR component 1332B, the component administering unit 132 generates the OCR component 1332B (step S1210). The OCR component 1332B is generated by using an API for generating a component defined in the component common I/F 1330.

When the OCR component 1332B is generated, the component administering unit 132 returns the OCR component 1332B to the flow executing unit 131. For example, the component administering unit 132 returns the address in the memory (e.g., the RAM 14), on which the OCR component 1332B is deployed, to the flow executing unit 131.

The flow executing unit 131 designates the data and requests the generated OCR component 1332B to execute the process (step S1211).

When the OCR component 1332B receives the execution request of the process, in which the data are designated, the OCR component 1332B executes the process to the designated data (step S1212). More specifically, the OCR component 1332B requests the OCR process 151 of the document servicing unit 150 to process, and the OCR process is executed for the data for which the OCR process is designated.

The OCR component 1332B returns data indicative of the electronic file provided with the OCR process to the flow executing unit 131.

Next, the flow executing unit 131 requests the component administering unit 132 to acquire the component in accordance with the acquired process content 1200 (step S1213). More specifically, the flow executing unit 131 requests the component administering unit 132 to acquire the translation component 1333B based on ".to("process:transB")" designated next to ".to("process:ocrB")" of the process content 1200 illustrated in FIG. 6B.

When the component administering unit 132 receives the acquisition request to acquire a translation component 1333B, the component administering unit 132 generates the translation component 13333 (step S1214). The translation component 13333 is generated by using the API for generating a component defined in the component common I/F 1333.

When the translation component 1333B is generated, the component administering unit 132 returns the translation component 13333 to the flow executing unit 131. For example, the component administering unit 132 returns the address in the memory (e.g., the RAM 14), on which the translation component 1333B is deployed, to the flow executing unit 131.

The flow executing unit 131 designates the data and requests the generated translation component 13333 to execute the process (step S1215). The data designated here is the electronic file provided with the OCR process.

When the translation component 13333 receives the execution request of the process, in which the data are designated, the translation component 13333 executes the process to the designated data (step S1216). More specifically, the translation component 13333 requests the translating process 152 of the document servicing unit 150 to process and executes a translating process to the predetermined language for the data designated by the translating process 152.

The translation component 1333B returns data indicative of the electronic file provided with the translating process to the flow executing unit 131.

Next, the flow executing unit 131 requests the component administering unit 132 to acquire the component in accordance with the acquired process content 1200 (step S1217). More specifically, the flow executing unit 131 requests the component administering unit 132 to acquire the delivery component 1331B based on ".to("storage:uploadFileB")" designated next to ".to("process:transB")" of the process content 1200 illustrated in FIG. 6B.

When the component administering unit 132 receives the acquisition request to acquire the delivery component 13313, the component administering unit 132 generates the delivery component 1331B (step S1218). The delivery component 1331B is generated by using the API for generating a component defined in the component common I/F 1330.

When the delivery component 1331B is generated, the component administering unit 132 returns the delivery component 13313 to the flow executing unit 131. For example, the component administering unit 132 returns the address in the memory (e.g., the RAM 14), on which the delivery component 13313 is deployed, to the flow executing unit 131.

The flow executing unit 131 designates the data and requests the generated delivery component 13313 to execute the process (step S1219). The data designated here is the electronic file provided with the translating process.

When the delivery component 1331B receives the execution request of the process, in which the data are designated, the delivery component 1331B executes the process to the designated data (step S1220). Said differently, the delivery component 13313 requests to execute the delivery of the data to a file processing unit 1702 of a storage-service B collaborating unit 1602 using an API for file storage defined as a common I/F 1712. Said differently, within the first embodiment, the delivery component 13313 requests the file processing unit 1702 of the storage-service B collaborating unit 1602 to perform the delivery execution of the data using the API of "service-b/process/folder" illustrated in FIG. 5A. With this, the electronic file provided with the translating process is stored in the folder of the folder ID input in the storage-destination-folder-ID input column 3300 illustrated in FIG. 10 in the storage service B.

The delivery component 13313 returns the data indicative of the executed result of the delivery execution to the flow executing unit 131.

The flow executing unit 131 returns the processed result of the sequence of processes (the substitute flow) acquired based on the acquired process content 1200 as the substitute flow content of the process content 1100 to the browser 210 (step S1221). With this, the user of the image forming apparatus 20 can know that the error occurs in the sequence of processes substantializing the scan delivery service, and the substitute flow is executed.

In the service providing system 10 of the first embodiment described above, in a case where an error or the like occurs in the sequence of processes (the process flow) based on the process content, executed is the sequence of processes (the substitute flow) based on the other process content (the substitute flow content) previously associated with the process content. With this, in the service providing system 10 of the first embodiment, in a case where the error occurs in a certain process flow, a substitute flow performing a process similar to the certain process flow can be executed.

Second Embodiment

Next, the information processing system 1 of a second embodiment is described. The second embodiment differs from the first embodiment in that, in a case where the substitute flow is executed, a processed result in conformity with the type of the substitute flow is returned to the browser 210. Hereinafter, portions having substantially the same functions as those of the first embodiment and portions performing the same processes as those of the first embodiment are designated by the same reference symbols as those of the first embodiment, and description of these portions is omitted.

<Software Structure>

Figure 13:
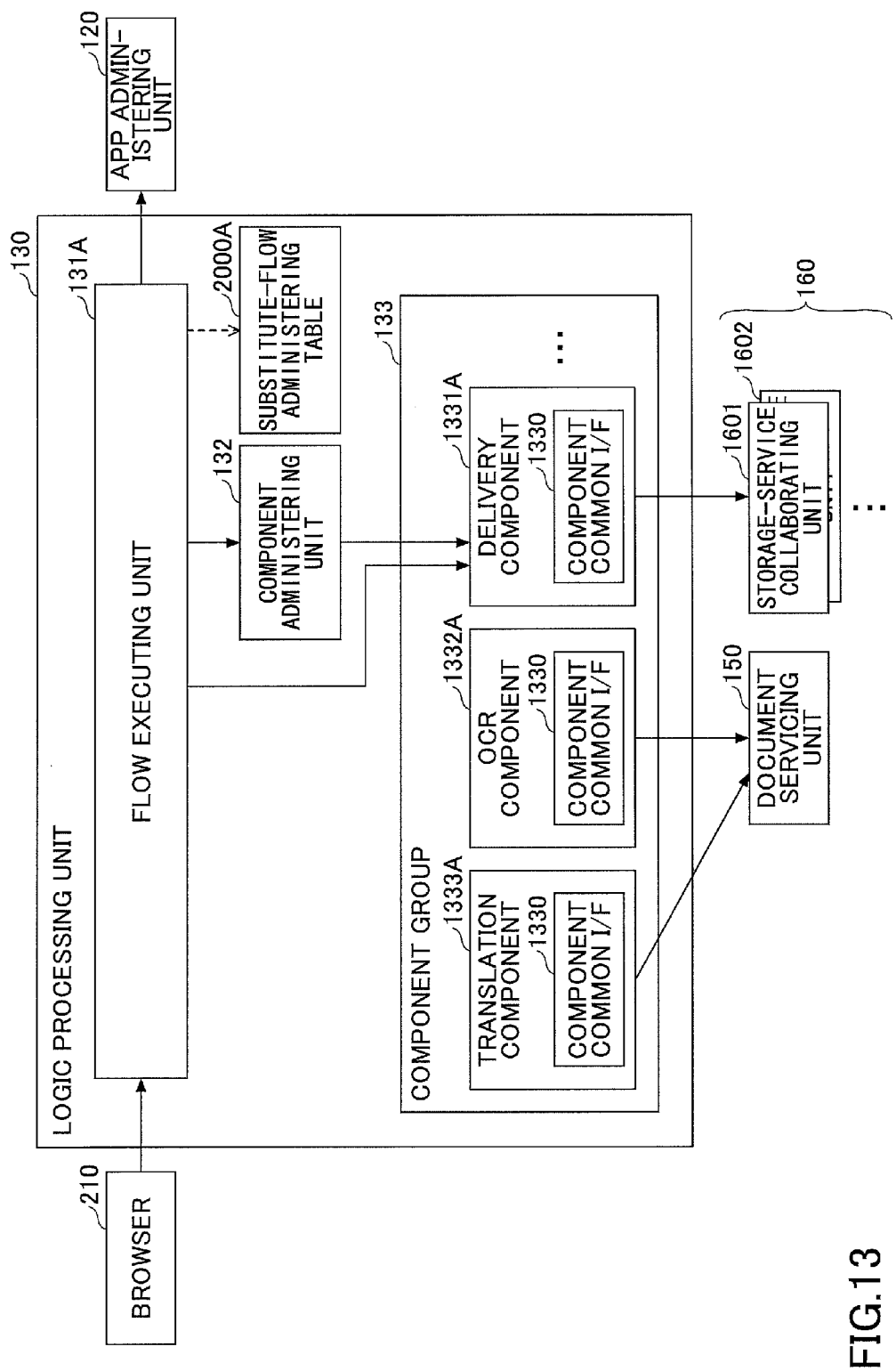
FIG. 13 is a processing block diagram of an exemplary logic processing unit of a second embodiment.

Referring to FIG. 13, described is a processing block of the logic processing unit 130 of the service providing system 10 included in the information processing system 1 of the second embodiment. FIG. 13 is a processing block diagram of an exemplary logic processing unit of the second embodiment.

The logic processing unit 130 of the service providing system 10 illustrated in FIG. 13 includes a flow executing unit 131A. The logic processing unit 130 of the service providing system 10 illustrated in FIG. 13 uses a substitute-flow administering table 2000A.

In a case where the sequence of processes (the substitute flow) based on the process content (the substitute flow content) corresponding to the substitute flow ID is executed, the flow executing unit 131A refers to the substitute-flow administering table 2000A and returns the processed result corresponding to the substitute flow type of the substitute flow.

Here, referring to FIG. 14, the substitute-flow administering table 2000 is described. FIG. 14 illustrates an exemplary substitute-flow administering table of the second embodiment.

The data items of the substitute-flow administering table 2000A illustrated in FIG. 14 further includes a substitute flow type. Said differently, in the substitute-flow administering table 2000A, the substitute flow type is associated with the substitute flow ID.

The substitute flow type is information indicative of the type of the processed result in a case where the sequence of processes (the substitute flow) is executed based on the process content (the substitute flow) indicated by the substitute flow ID.

For example, in a case where the substitute flow corresponding to the substitute flow ID whose substitute flow type is "type 1" is executed, the flow executing unit 131 returns the processed result indicative of "success" as the processed result of the substitute flow to the browser 210. For example, in a case where the substitute flow corresponding to the substitute flow ID whose substitute flow type is "type 2" is executed, the flow executing unit 131 returns the processed result indicative of "failure" as the processed result of the substitute flow to the browser 210.

<Detailed Process>

Described next is a detailed process of the information processing system of the second embodiment.

<<Flow Execution Process>>

Figure 15:
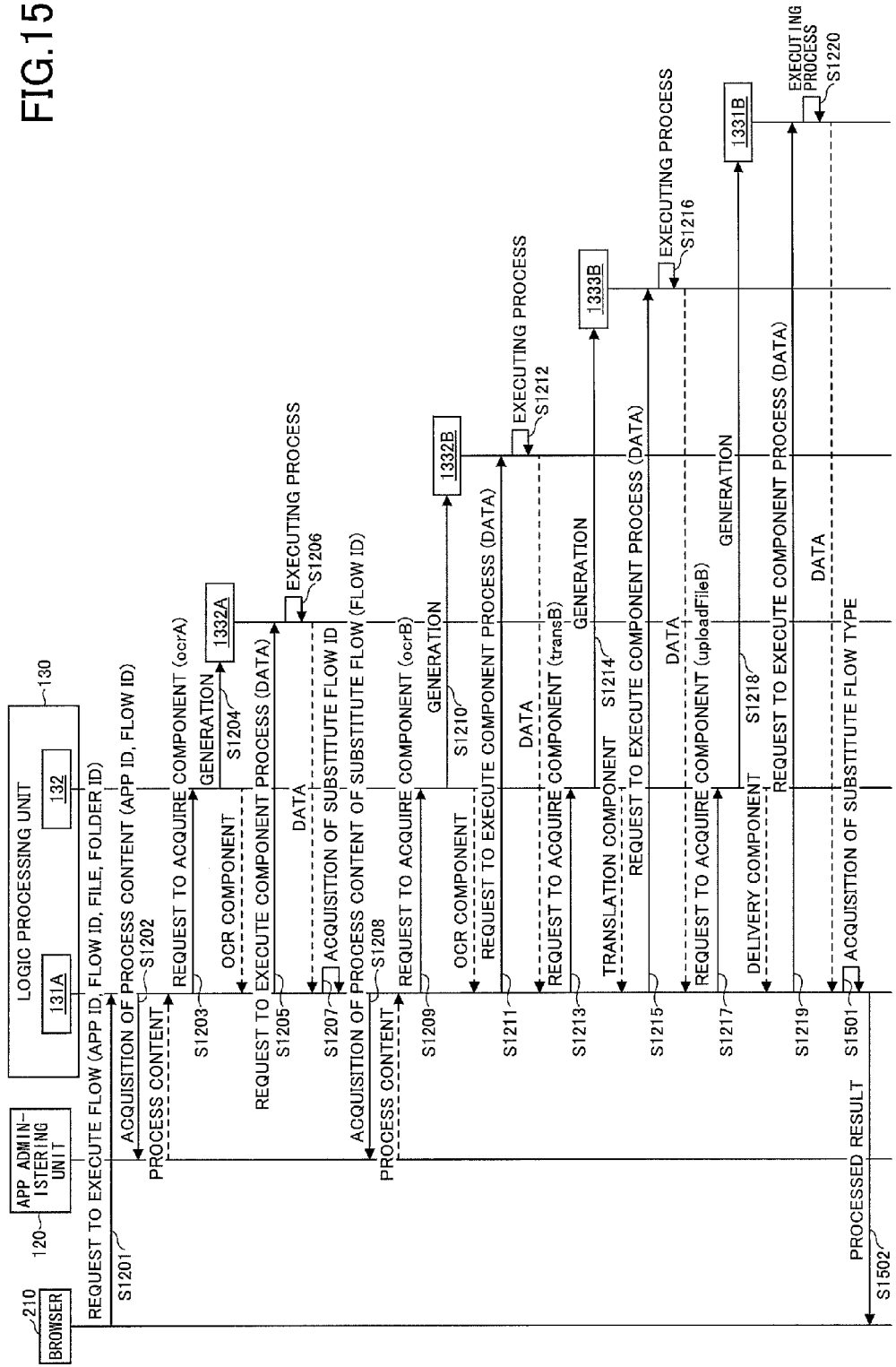
FIG. 15 is a sequence chart of an exemplary flow execution process of the second embodiment.

Referring to FIG. 15, described next is the case where the error occurs during the flow execution process. FIG. 15 is a sequence chart of an exemplary flow execution process of the second embodiment. Because the processes of steps S1201 to S1220 are similar to the processes of the first embodiment, the description of these processes is omitted.

The flow executing unit 131A refers to the substitute-flow administering table 2000A and acquires the substitute flow type of the executed substitute flow (step S1501). More specifically, the flow executing unit 131A acquires the substitute flow type "type 1" associated with the substitute flow ID "flow002" in the substitute-flow administering table 2000A.

Next, the flow executing unit 131A returns the processed result corresponding to the acquired substitute flow type to the browser 210 (step S1502). More specifically, the flow executing unit 131A returns the processed result indicative of "success" to the browser 210 in response to the acquired substitute flow type "type1".

As described, in the service providing system 10 of the second embodiment 10, in a case where the substitute flow is executed, the processed result corresponding to the substitute flow type of the substitute flow is returned to the image forming apparatus 20. With this, in the service providing system 10 of the second embodiment, an appropriate processed result corresponding to the type and the content of the executed substitute flow to the image forming apparatus 20.

For example, in a case where the substitute flow substantializing the processes similar to the process flow, in which the error occurs, is executed, the substitute flow ID may be caused to be associated with the substitute flow type "type1" in the substitute-flow administering table 2000A. With this, in the service providing system 10 of the second embodiment, the processed result indicating "success" can be returned to the browser 210 in a case where the substitute flow substantializing the processes similar to the processes of the process flow are executed.

For example, in a case where the substitute flow substantializing the processes similar to the process flow, in which the error occurs, is executed, the substitute flow ID may be caused to be associated with the substitute flow type "type2" in the substitute-flow administering table 2000A. With this, the service providing system 10 of the second embodiment 10 can return the processed result indicative of "failure" to the browser 210 in a case where the substitute flow is executed.

Third Embodiment

Next, the information processing system 1 of a third embodiment is described. The third embodiment differs from the first embodiment at points that the error generated in the process flow is determined to be a recoverable error or not, and that another process content is acquired in response to this determined result. Hereinafter, portions having substantially the same functions as those of the first embodiment and portions performing the same processes as those of the first embodiment are designated by the same reference symbols as those of the first embodiment, and description of these portions is omitted.

<Software Structure>

Figure 16:
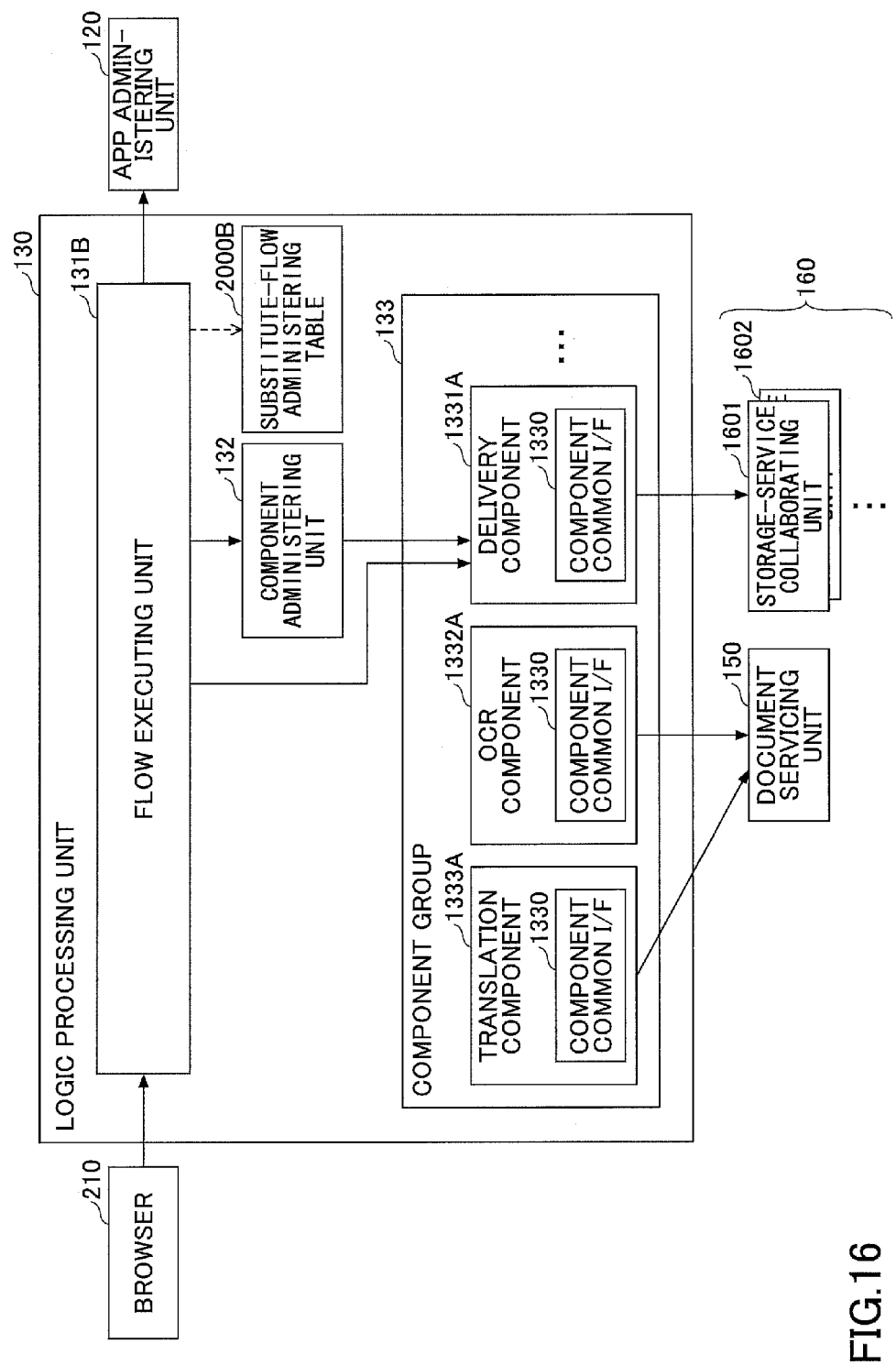
FIG. 16 is a processing block diagram of an exemplary logic processing unit of a third embodiment.

Referring to FIG. 16, described is the processing block of the logic processing unit 130 of the service providing system 10 included in the information processing system 1 of the third embodiment. FIG. 16 is a processing block diagram of an exemplary logic processing unit of the third embodiment.

The logic processing unit 130 of the service providing system 10 illustrated in FIG. 16 includes a flow executing unit 131B. The logic processing unit 130 of the service providing system 10 illustrated in FIG. 16 uses a substitute-flow administering table 2000B.

In a case where an error or the like occurs in the sequence of processes (the process flow) based on the process content, the flow executing unit 131B determines whether the error is a recoverable error. Then, the flow executing unit 131B refers to the substitute-flow administering table 2000B and acquires the substitute flow ID or an exceptional flow ID in response to the determined result.

The exceptional flow ID is a flow ID of the process content (an exceptional flow content), which is executed in the case where the unrecoverable error occurs in the process flow. In an exceptional flow content, a content of a process substantializing, for example, an output of error information and an error report.

Here, referring to FIG. 17, the substitute-flow administering table 2000B is described. FIG. 17 illustrates an exemplary substitute-flow administering table of the third embodiment.

The data items of the substitute-flow administering table 2000B illustrated in FIG. 17 further includes the exceptional flow ID. Said differently, in the substitute-flow administering table 2000B, the substitute flow ID and the exceptional flow ID are associated with the flow ID.

For example, the substitute flow ID "flow002" and the exceptional flow ID "flow900" are associated with the flow ID "flow001". With this, in the case where the error or the like occurs in the process flow, the flow executing unit 131B can acquire the process content (the substitute flow content) of the substitute flow ID or the process content (the exceptional flow content) of the exceptional flow ID.

<Detailed Process>

Described next is a detailed process of the information processing system 1 of the third embodiment.

<<Flow Execution Process>>

Figure 18:
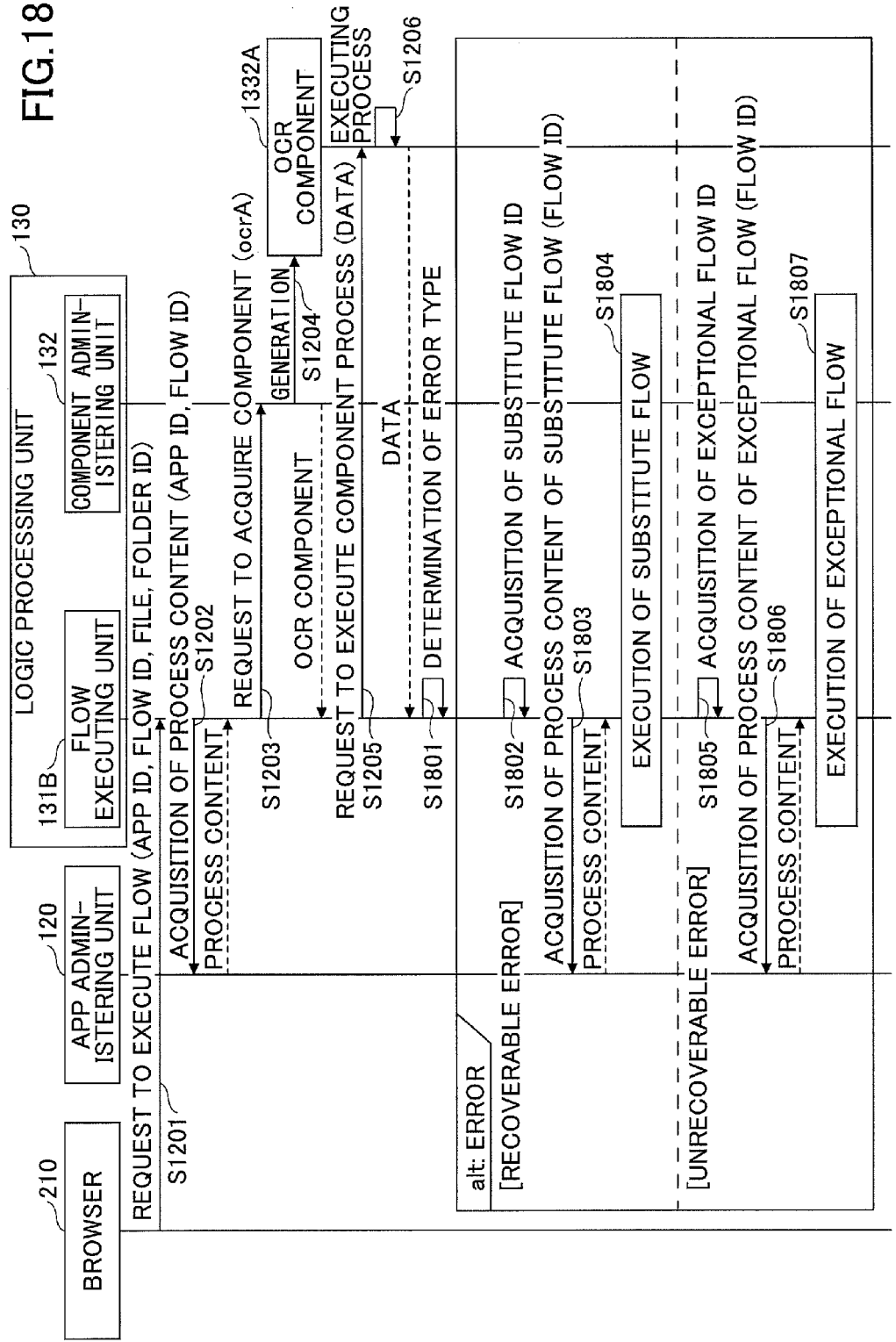
FIG. 18 is a sequence chart of an exemplary flow execution process of the third embodiment.

Referring to FIG. 18, described next is the case where the error occurs during the flow execution process. FIG. 18 is a sequence chart of an exemplary flow execution process of the third embodiment. Because the processes of steps S1201 to S1206 are similar to the processes of the first embodiment, the description of these processes is omitted.

In a case where an error or the like occurs in the sequence of processes (the process flow) based on the process content, the flow executing unit 131B determines whether the error is a recoverable error (step S1801).

Here, the recoverable error is the error type, in which the substitute flow may be executed. Meanwhile, the unrecoverable error is the error type, in which the substitute flow may not be executed. The unrecoverable error may include a case where the substitute flow does not exist, for example.

In a case where the occurred error is determined to be the recoverable error in step S1801, the flow executing unit 131B executes the processes of steps S1802 to step S1804. In a case where the occurred error is determined to be the unrecoverable error in step S1801, the flow executing unit 131B executes the processes of steps S1805 to step S1807.

In the case where the occurred error is determined to be the recoverable error, the flow executing unit 131B refers to the substitute-flow administering table 2000B and acquires the substitute flow ID associated with the flow ID of the process content 1100 (step S1802). More specifically, the flow executing unit 131B acquires the substitute flow ID "flow002" associated with the flow ID "flow001" of the process content 1100 in the substitute-flow administering table 2000B.

Next, after the flow executing unit 131B acquires the substitute flow ID, the flow executing unit 131B acquires the process content (the substitute flow content) of the substitute flow ID "flow002" through the app administering unit 120 (step S1803). Said differently, the flow executing unit 131B acquires the process content illustrated in FIG. 6B.

The flow executing unit 131B executes the substitute flow based on the acquired process content 1200 (step S1804). In this case, the processes similar to steps S1209 to S1221 are conducted.

In the case where the occurred error is determined to be the unrecoverable error, the flow executing unit 131B refers to the substitute-flow administering table 2000B and acquires the exceptional flow ID associated with the flow ID of the process content 1100 (step S1805). More specifically, the flow executing unit 131B acquires the substitute flow ID "flow900" associated with the flow ID "flow001" of the process content 1100 in the substitute-flow administering table 2000B.

Next, after the flow executing unit 131B acquires the exceptional flow ID, the flow executing unit 131B acquires the process content (the exceptional flow content) of the exceptional flow ID "flow900" through the app administering unit 120 (step S1806).

The flow executing unit 131B executes the exceptional flow based on the acquired exceptional flow content (step S1807).

As described, in the service providing system 10 of the third embodiment, in a case where the error occurs in the process flow, the substitute flow or the exceptional flow can be executed depending on whether the occurred error is recoverable or unrecoverable. Therefore, in the service providing system 10 of the third embodiment, for example, in a case where an unrecoverable serious error occurs in the process flow, the exceptional flow for reporting the occurrence of the error to the image forming apparatus 20 may be executed.

Fourth Embodiment

Next, the information processing system 1 of a fourth embodiment is described. The fourth embodiment differs from the first embodiment at a point of generating, in a case where the error or the like occurs in the process flow, the process content (the substitute flow content) causing the other component (the substitute component) previously associated with the component, in which the error occurs, to be executed. Said differently, in the fourth embodiment, in a case where the error or the like occurs in the component, the substitute flow content for causing the substitute component to be executed is dynamically generated. Hereinafter, portions having substantially the same functions as those of the first embodiment and portions performing the same processes as those of the first embodiment are designated by the same reference symbols as those of the first embodiment, and description of these portions is omitted.

<Software Structure>

Figure 19:
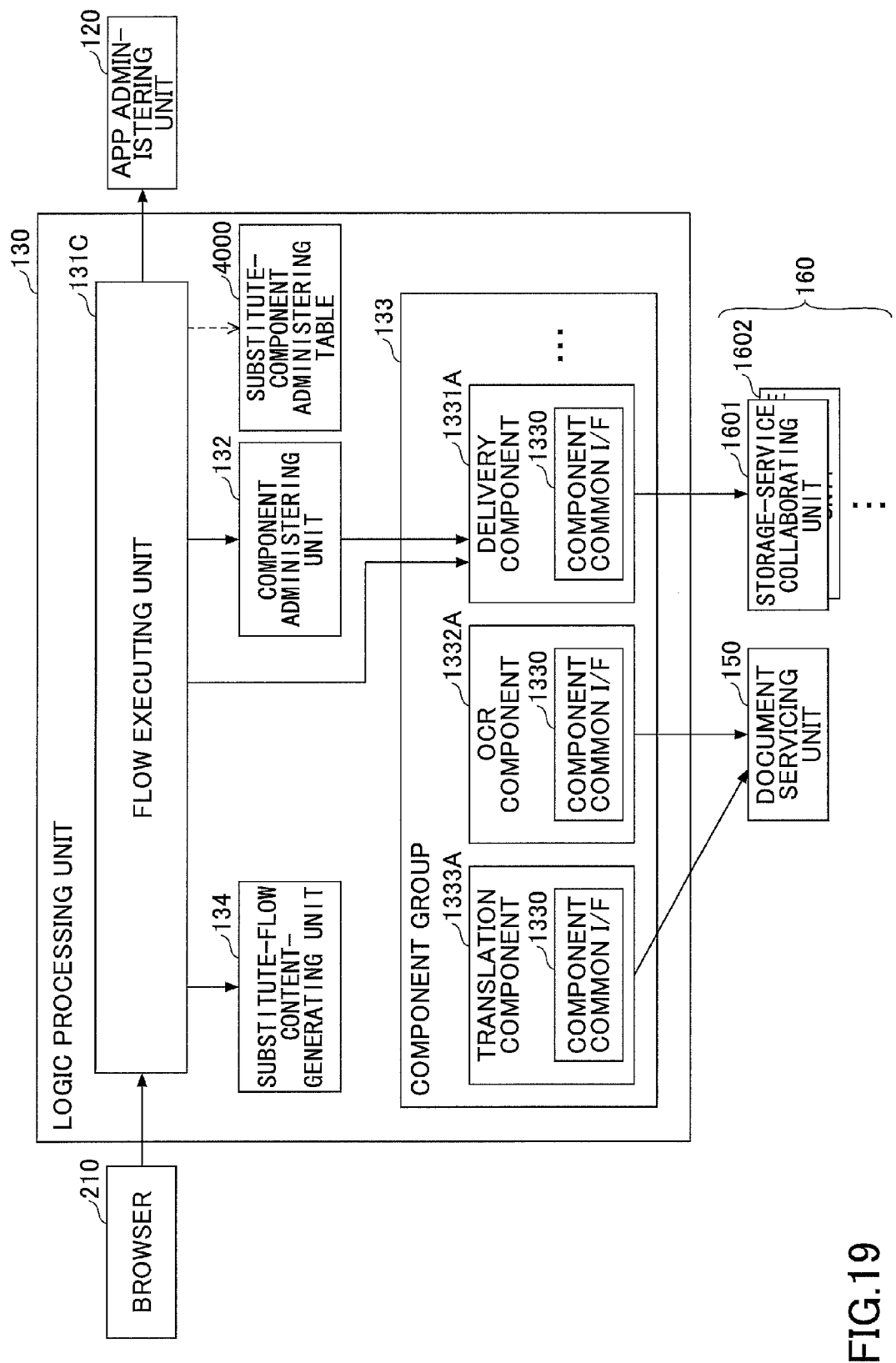
FIG. 19 is a processing block diagram of an exemplary logic processing unit of a fourth embodiment.

Referring to FIG. 19, described is the processing block of the logic processing unit 130 of the service providing system 10 included in the information processing system 1 of the fourth embodiment. FIG. 19 is a processing block diagram of an exemplary logic processing unit of the fourth embodiment.

The logic processing unit 130 of the service providing system 10 illustrated in FIG. 19 includes a flow executing unit 131C and a substitute-flow content-generating unit 134. The logic processing unit 130 of the service providing system 10 illustrated in FIG. 19 uses a substitute-component administering table 4000.

In a case where the error or the like occurs in a component executing each process of the sequence of processes based on the process content, the flow executing unit 131C acquires the substitute component ID of the component, in which the error or the like occurs, from the substitute-component administering table 4000. The flow executing unit 131 requests the substitute-flow content-generating unit 134 to generate the process content (the substitute flow content) for causing the component of the acquired substitute component ID to be executed.

The substitute-flow content-generating unit 134 generates, in response to the request by the flow executing unit 131C, the substitute flow content based on the substitute component ID included in the request.

Here, referring to FIG. 20, the substitute-flow administering table 4000 is described. FIG. 20 illustrates an exemplary substitute-component administering table of the fourth embodiment.

The data items of the substitute-component administering table 4000 illustrated in FIG. 20 includes a flow ID, a component ID, and a substitute component ID. Said differently, in the substitute-component administering table 4000, the component ID for uniquely identifying the component and the substitute component ID indicative of the component ID of the substitute component are associated for each flow ID. Here, the substitute component is executed in a case where an error or the like occurs in the component and is, for example, another component performing a process similar to the component in which the error or the like occurs.

For example, the substitute component ID "ocrB" is associated with the component ID "ocrA" in the flow ID "flow001". With this, in a case where the error or the like occurs in the component of the component ID "ocrA" in the process flow of the flow ID "flow001", it is possible to generate the process content causing the component of the substitute component ID "ocrB" to be executed.

In a manner similar thereto, the substitute component ID "uploadFileA" is associated with the component ID "uploadFileB" in, for example, the flow ID "flow002". With this, in a case where the error or the like occurs in the component of the component ID "uploadFileB" in the process flow of the flow ID "flow002", it is possible to generate the process content causing the component of the substitute component ID "uploadFileA" to be executed.

In the substitute-component administering table 4000, the component ID and the substitute component ID whose flow IDs are "-" are used in a case where there is no component ID of the component, in which the error or the like occurs in the corresponding flow ID. For example, in a case where the error or the like occurs in the component of the component ID "transB" in the process flow of the flow ID "flow002", the substitute component ID "transC" is used to generate the process content (the substitute flow content).

<Detailed Process>

Described next is a detailed process of the information processing system 1 of the fourth embodiment.

<<Flow Execution Process>>

Figure 21:
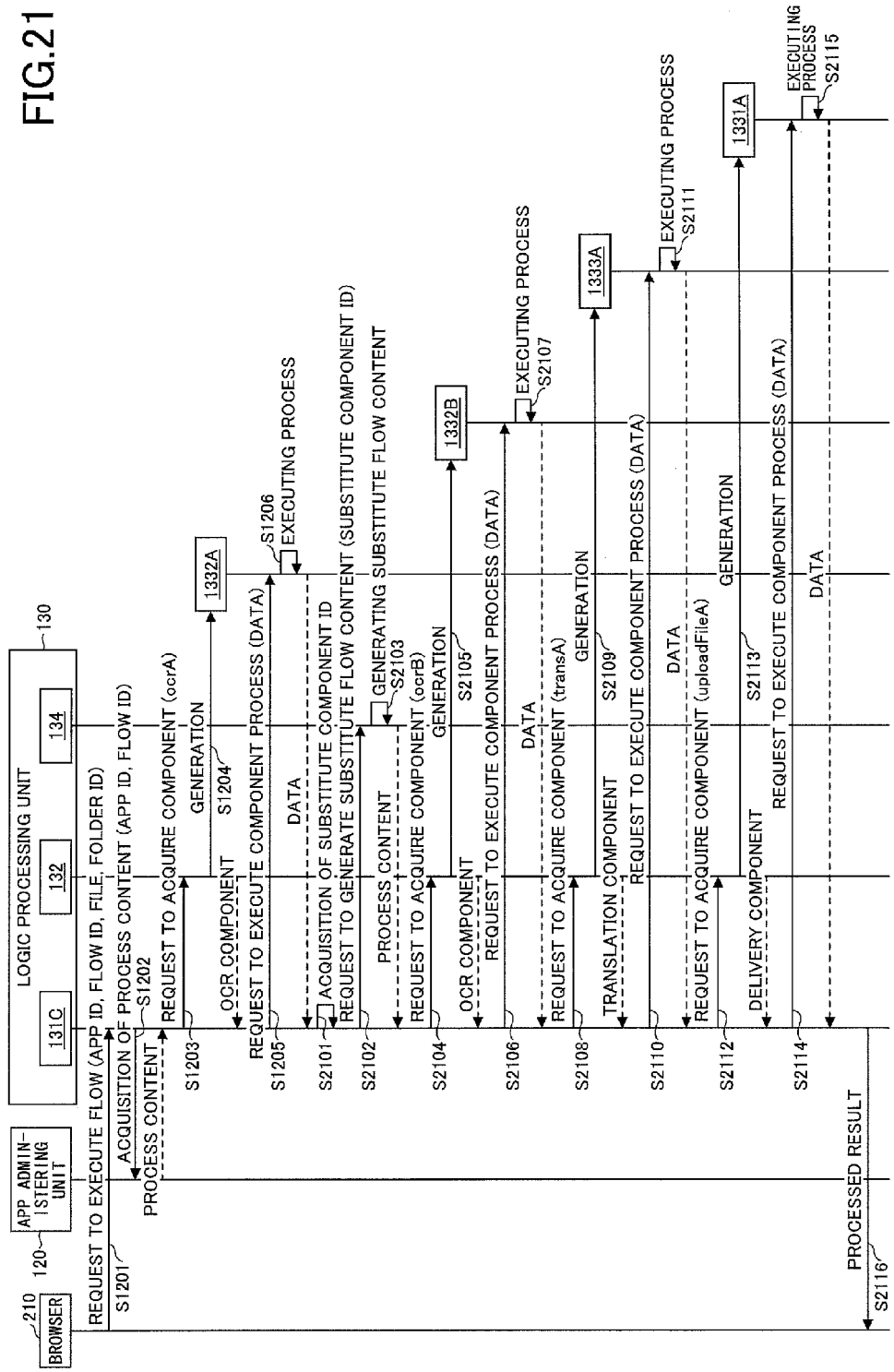
FIG. 21 is a sequence chart of an exemplary flow execution process of the fourth embodiment.

Referring to FIG. 21, described next is the case where the error occurs during the flow execution process. FIG. 21 is a sequence chart of an exemplary flow execution process of the fourth embodiment. Because the processes of steps S1201 to S1206 are similar to the processes of the first embodiment, the description of these processes is omitted.

After the flow executing unit 131C receives data indicating that the error occurs, the flow executing unit 131C refers to the substitute-component administering table 4000 and acquires the corresponding substitute component ID (step S2101). Said differently, the flow executing unit 131C acquires the substitute component ID "ocrB" associated with the flow ID "flow001" of the process content 1100 acquired in step S1202 and the component ID "ocrA" of the OCR component 1332A.

Next, the flow executing unit 131C sends a generation request to generate the substitute flow content including the acquired substitute component ID "ocrB" to the substitute-flow content-generating unit 134 (step S2102).

After the substitute-flow content-generating unit 134 receives the generation request of the substitute flow content, the substitute-flow content-generating unit 134 generates the substitute flow content based on the substitute component ID "ocrB" included in the generation request (step S2103). Said differently, the substitute-flow content-generating unit 134 changes the component ID "ocrA" included in the process content 1100 to the substitute component ID "ocrB" to generate the process content 1300 illustrated in FIG. 22.

The substitute-flow content-generating unit 134 returns the generated process content 1300 to the flow executing unit 131C.

As indicated by a broken line 1301 in the process content 1300 illustrated in FIG. 22, ".to("process:ocrA")" is changed to ".to("process:ocrB")" in the process content. With this, the sequence of processes (the substitute flow) based on the process content 1300 can be performed by the OCR component 1332B.

The flow executing unit 131 requests the component administering unit 132 to acquire the component in accordance with the acquired process content 1300 (step S2104). More specifically, the flow executing unit 131C requests the component administering unit 132 to acquire the OCR component 1332B based on ".to("process:ocrB")" designated in the process content 1300 illustrated in FIG. 22.

When the component administering unit 132 receives the acquisition request to acquire the OCR component 1332B, the component administering unit 132 generates the OCR component 1332B (step S2105). When the OCR component 1332B is generated, the component administering unit 132 returns the OCR component 1332B to the flow executing unit 131C.

The flow executing unit 131C designates the data and requests the generated OCR component 1332B to execute the process (step S2106).

When the OCR component 1332B receives the execution request of the process, in which the data are designated, the OCR component 1332B executes the process to the designated data (step S2107). The OCR component 1332B returns data indicative of the electronic file provided with the OCR process to the flow executing unit 131C.

Next, the flow executing unit 131C requests the component administering unit 132 to acquire the component in accordance with the acquired process content 1300 (step S2108). More specifically, the flow executing unit 131C requests the component administering unit 132 to acquire the translation component 1333A based on ".to("process:transA")" designated next to ".to("process:ocrB")" of the process content 1300 illustrated in FIG. 22.

When the component administering unit 132 receives the acquisition request to acquire a translation component 1333A, the component administering unit 132 generates the translation component 1333A (step S2109). When the translation component 1333A is generated, the component administering unit 132 returns the translation component 1333A to the flow executing unit 131C.

The flow executing unit 131C designates data and requests the generated translation component 1333A to execute the process (step S210). The data designated here is the electronic file provided with the OCR process.

When the translation component 1333A receives the execution request of the process, in which the data are designated, the translation component 1333A executes the process to the designated data (step S2111). The translation component 1333A returns data indicative of the electronic file provided with the translating process to the flow executing unit 131C.

Next, the flow executing unit 131C requests the component administering unit 132 to acquire the component in accordance with the acquired process content 1300 (step S2112). More specifically, the flow executing unit 131C requests the component administering unit 132 to acquire the delivery component 13313 based on ".to("storage:uploadFileA")" designated next to ".to("process:transA")" of the process content 1300 illustrated in FIG. 22.

When the component administering unit 132 receives the acquisition request to acquire the delivery component 1331A, the component administering unit 132 generates the delivery component 1331A (step S2113). When the delivery component 1331A is generated, the component administering unit 132 returns the delivery component 1331A to the flow executing unit 131C.

The flow executing unit 131C designates data and requests the generated translation component 1333A to execute the process (step S2114). The data designated here is the electronic file provided with the translating process.

Next, when the delivery component 1331A receives the execution request of the process, in which the data are designated, the delivery component 1331A executes the process to the designated data (step S2115). Said differently, the delivery component 1331 requests the file processing unit 1701 of the storage-service A collaborating unit 1601 to execute the data delivery using the API for the file storage defined as the common I/F 1711. With this, the electronic file provided with the translating process is stored in a predetermined folder of the storage service A.

The delivery component 1331A returns the data indicative of the executed result of the delivery execution to the flow executing unit 131C.

The flow executing unit 131C returns the processed result of the sequence of processes (the substitute flow) acquired based on the process content 1300 to the browser 210 (step S2216). With this, the user of the image forming apparatus 20 can know that the error occurs in the sequence of processes (the process flow) substantializing the scan delivery service and the substitute component is executed in place of the component, in which the error occurs.

As described, in the service providing system 10 of the fourth embodiment, in a case where the error or the like occurs in the component of the sequence of processes (the substitute flow) performed based on the process content, the process content (the substitute flow content) causing the substitute component of the component to be executed is generated.

In the service providing system 10 of the fourth embodiment, the process content (the substitute flow content) based on the generated process content (the substitute flow content) is executed. With this, in the service providing system 10 of the fourth embodiment, in a case where the error occurs in the process flow, the substitute component performing a process similar to the component can be executed.

Fifth Embodiment

Described Next is the information processing system 1 of a fifth embodiment. The fifth embodiment differs from the fourth embodiment in that, in a case where the substitute flow is executed, a processing result in conformity with the type of the substitute flow is returned to the browser 210. Hereinafter, portions having substantially the same functions as the functions in the fourth embodiment and portions performing the same processes as the processes in the fourth embodiment are designated by the same reference symbols as the reference symbols in the fourth embodiment, and description of these portions is omitted.

<Software Structure>

Figure 23:
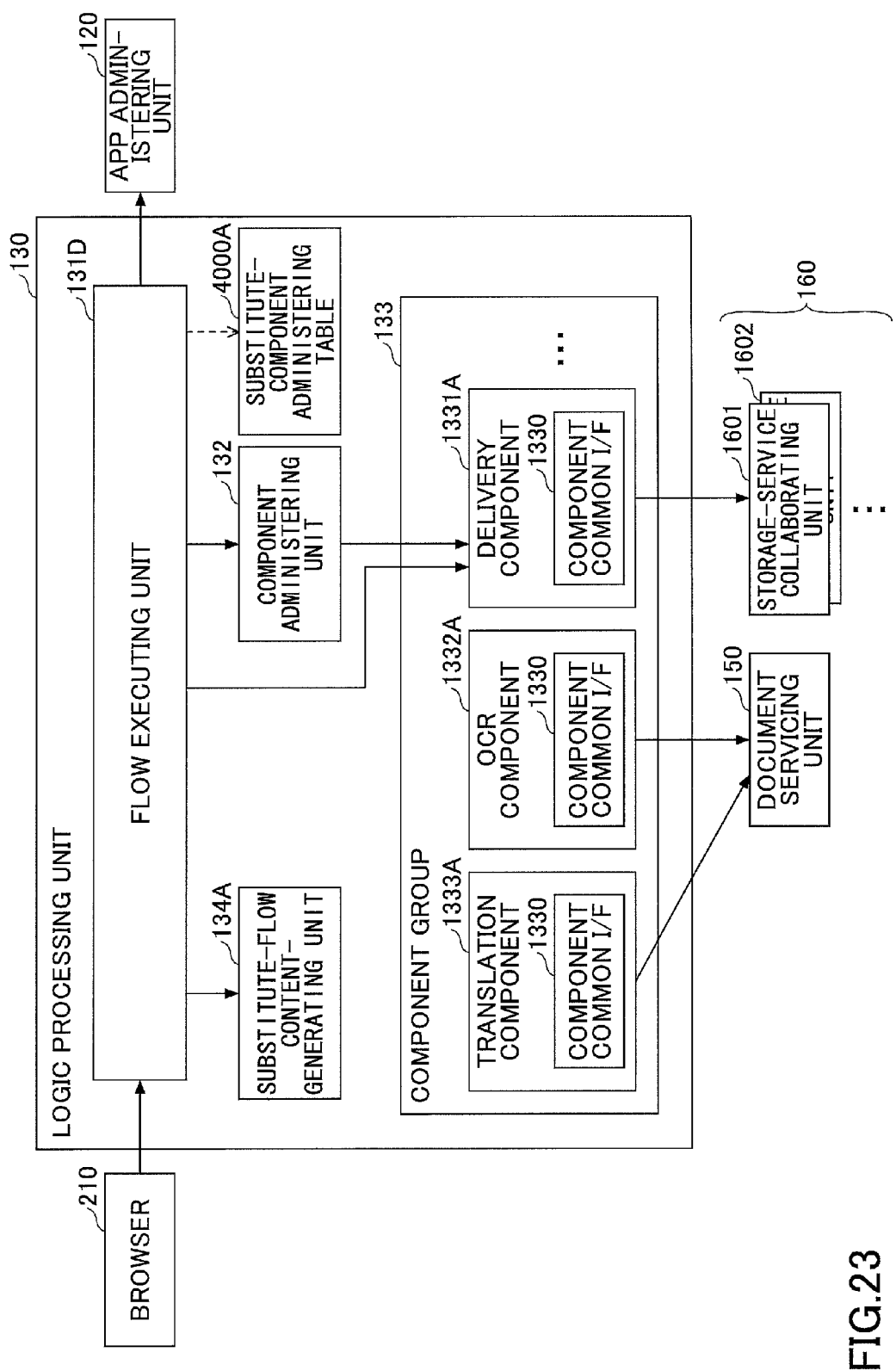
FIG. 23 is a processing block diagram of an exemplary logic processing unit of a fifth embodiment.

Referring to FIG. 23, described is the processing block of the logic processing unit 130 of the service providing system 10 included in the information processing system 1 of the fifth embodiment. FIG. 23 is a processing block diagram of an exemplary logic processing unit of the fifth embodiment.

The logic processing unit 130 of the service providing system 10 illustrated in FIG. 23 includes a flow executing unit 131D and a substitute-flow content-generating unit 134A. The logic processing unit 130 of the service providing system 10 illustrated in FIG. 23 uses a substitute-component administering table 4000A.

The flow executing unit 131D acquires the substitute component ID and the substitute component type of the component, in which the error occurs, from the substitute-component administering table 4000A. The flow executing unit 131 requests the substitute-flow content-generating unit 134A to generate the process content (the substitute flow content) for causing the component of the acquired substitute component ID to be executed.

In a case where the sequence of processes (the substitute flow) is executed based on the process content (substitute flow content), the flow executing unit 131D acquires the substitute flow type from the process content and returns the processed result corresponding to the substitute flow type.

The substitute-flow content-generating unit 134A generates, in response to the request by the flow executing unit 131D, the substitute flow content based on the substitute component ID and the substitute component type included in the request.

Here, referring to FIG. 24, the substitute-flow administering table 4000A is described. FIG. 24 illustrates an exemplary substitute-component administering table of the fifth embodiment.

The data items of the substitute-flow administering table 4000A illustrated in FIG. 24 further includes a substitute component type as the data item. Said differently, in the substitute-component administering table 4000A, the substitute component type is associated with the flow ID, the component ID, and the substitute component ID. The substitute component type is information indicative of a type of the processed result of the substitute flow in a case where the component of the substitute component ID is executed.

For example, in a case where the component of the substitute flow ID whose substitute component type is "type 1" is executed, the flow executing unit 131D returns the processed result indicative of "success" as the processed result of the substitute flow to the browser 210. For example, in a case where the component of the substitute flow ID whose substitute component type is "type 2" is executed, the flow executing unit 131D returns the processed result indicative of "failure" as the processed result of the substitute flow to the browser 210.

<Detailed Process>

Described next is a detailed process of the information processing system 1 of the fifth embodiment.

<<Flow Execution Process>>

Figure 25:
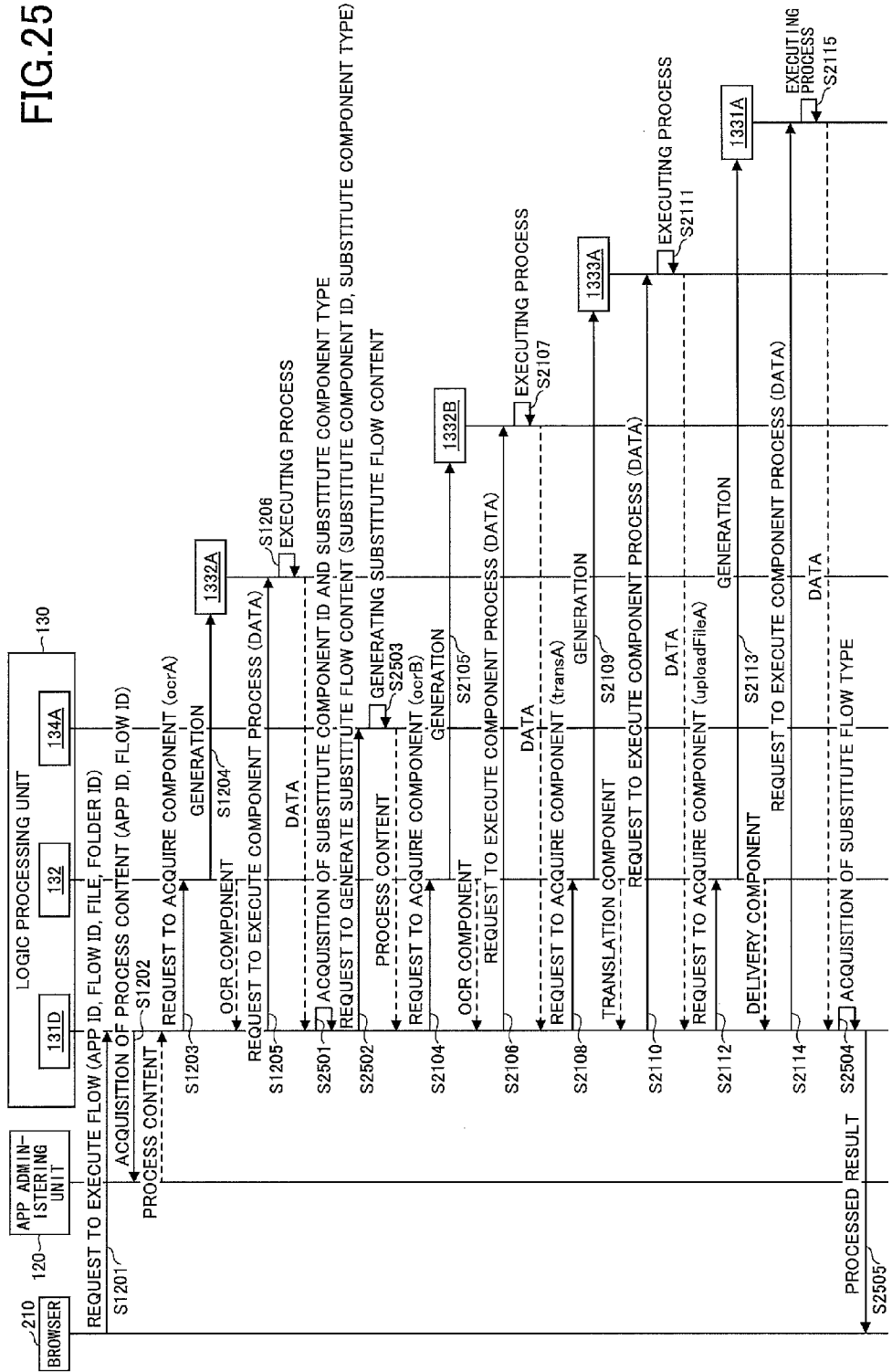
FIG. 25 is a sequence chart of an exemplary flow execution process of the fifth embodiment.

Referring to FIG. 25, described next is the case where the error occurs during the flow execution process. FIG. 25 is a sequence chart of an exemplary flow execution process of the fifth embodiment.

After the flow executing unit 131D receives data indicating that the error occurs, the flow executing unit 131D refers to the substitute-component administering table 4000 and acquires the corresponding substitute component ID (step S2501). Said differently, the flow executing unit 131D acquires the substitute component ID "ocrB" and the substitute component type "type1", which are associated with the flow ID "flow001" of the process content 1100 and the component ID "ocrA" of the OCR component 1332A.

Next, the flow executing unit 131D sends a generation request to generate the substitute flow content including the acquired substitute component ID "ocrB" and the substitute component type "type1" to the substitute-flow content-generating unit 134A (step S2502).

After the substitute-flow content-generating unit 134A receives the generation request of the substitute flow content, the substitute-flow content-generating unit 134A generates the substitute flow content based on the substitute component ID "ocrB" and the substitute component type "type1" included in the generation request (step S2103). Said differently, the substitute-flow content-generating unit 134A changes the component ID "ocrA" included in the process content 1100 to the substitute component ID "ocrB" and adds the substitute component type "type1" to generate the process content 1400 illustrated in FIG. 26.

The substitute-flow content-generating unit 134A returns the generated process content 1400 to the flow executing unit 131D.

In the process content 1400 illustrated in FIG. 26, the substitute flow type of flowtype:"type1" is added to the process content 1100 based on the substitute component type "type1" as indicated by a broken line 1401. In the process content 1400 illustrated in FIG. 26, ".to("process:ocrA")" is changed to ".to("process:ocrB")" in the process content as indicated by a broken line 1402. With this, in the sequence of processes (the substitute flow) based on the process content 1400, the process can be performed by the OCR component 1332B and the processed result corresponding to the substitute flow type "type1" can be returned to the browser 210.

Because the processes of steps S2104 to S2115 are similar to the processes of the fourth embodiment, the description of these processes is omitted.

The flow executing unit 131D acquires the substitute flow type of the executed substitute flow (step S2504). More specifically, the flow executing unit 131D acquires the substitute flow type "type1" from "flowtype:"type1"" included in the process content 1400 of the executed substitute flow.

Next, the flow executing unit 131A returns the processed result corresponding to the acquired substitute flow type to the browser 210 (step S2505). More specifically, the flow executing unit 131D returns the processed result indicative of "success" to the browser 210 in response to the acquired substitute flow type "type1".

As described, in the service providing system 10 of the fifth embodiment 10, in a case where the substitute flow is executed, the processed result corresponding to the substitute flow type of the substitute flow is returned to the image forming apparatus 20. Further, in the service providing system 10 of the fifth embodiment, the substitute flow type is designated based on the substitute component type associated with the substitute component ID. With this, in the service providing system 10 of the fifth embodiment, an appropriate processed result corresponding to the type and the content of the executed substitute component to the image forming apparatus 20.

Sixth Embodiment

Next, the information processing system 1 of a sixth embodiment is described. The sixth embodiment differs from the fourth embodiment at points that the error generated in the component executing each process is determined to be a recoverable error or not, and that the component ID of another component is acquired in response to this determined result. Hereinafter, portions having substantially the same functions as the functions in the fourth embodiment and portions performing the same processes as the processes in the fourth embodiment are designated by the same reference symbols as the reference symbols in the fourth embodiment, and description of these portions is omitted.

<Software Structure>

Figure 27:
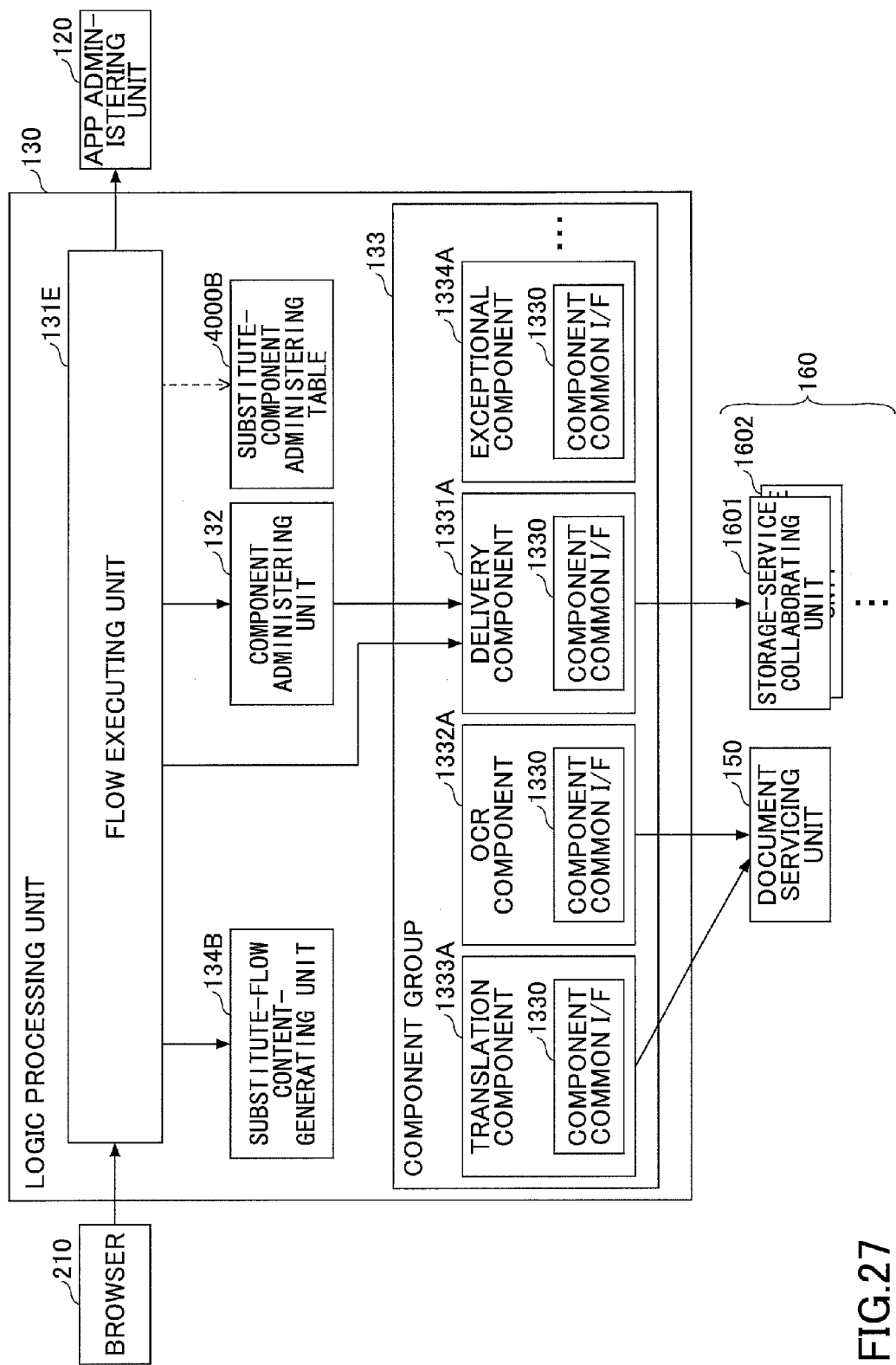
FIG. 27 is a processing block diagram of an exemplary logic processing unit of a sixth embodiment.

Referring to FIG. 27, described is the processing block of the logic processing unit 130 of the service providing system 10 included in the information processing system 1 of the sixth embodiment. FIG. 27 is a processing block diagram of an exemplary logic processing unit of the sixth embodiment.

The logic processing unit 130 of the service providing system 10 illustrated in FIG. 27 includes a flow executing unit 131E and the substitute-flow content-generating unit 134B. Further, the component group 133 of the logic processing unit 130 of the service providing system 10 illustrated in FIG. 27 includes an exceptional component 1334A or the like.

The logic processing unit 130 of the service providing system 10 illustrated in FIG. 27 uses a substitute-component administering table 4000B.

In a case where an error or the like occurs in the sequence of processes (the process flow) based on the process content, the flow executing unit 131E determines whether the error is a recoverable error. Then, the flow executing unit 131E refers to the substitute-component administering table 4000B and acquires the substitute flow ID or the exceptional flow ID in response to the determined result.

Here, the exceptional component ID is a component ID of another component (the exceptional component 1334A) executed in a case where the unrecoverable error occurs in the component executing each process in the process flow. The exceptional component 1334A executes processes such as an output of error information and an error report.

The substitute-flow content-generating unit 134B generates, in response to the request by the flow executing unit 131E, the substitute flow content based on the substitute component ID and the exceptional component ID included in the request.

Here, referring to FIG. 28, the substitute-component administering table 4000B is described. FIG. 28 illustrates an exemplary substitute-component administering table of the sixth embodiment.

The data items of the substitute-component administering table 4000B illustrated in FIG. 28 further includes the exceptional component ID as the data item. Said differently, in the substitute-component administering table 4000B, the exceptional component ID is associated with the flow ID and the component ID in addition to the substitute component ID associated with the flow ID and the component ID.

For example, the exceptional component ID "exceptA" of the exceptional component 1334A is associated with the flow ID "flow001" and the component ID "ocrA" in addition to the substitute component ID "ocrB" associated with the flow ID "flow001" and the component ID "ocrA". For example, the exceptional component ID "exceptB" of the exceptional component 1334B is associated with the flow ID "flow001" and the component ID "uploadFileA" in addition to the substitute component ID "uploadFileB" associated with the flow ID "flow001" and the component ID "uploadFileA".

With this, in a case where the error or the like occurs in the component executing each process of the process flow, the flow executing unit 131E can acquire the substitute component ID or the exceptional component ID in response to the error.

<Detailed Process>

Described next is a detailed process of the information processing system 1 of the sixth embodiment.

<<Flow Execution Process>>

Figure 29:
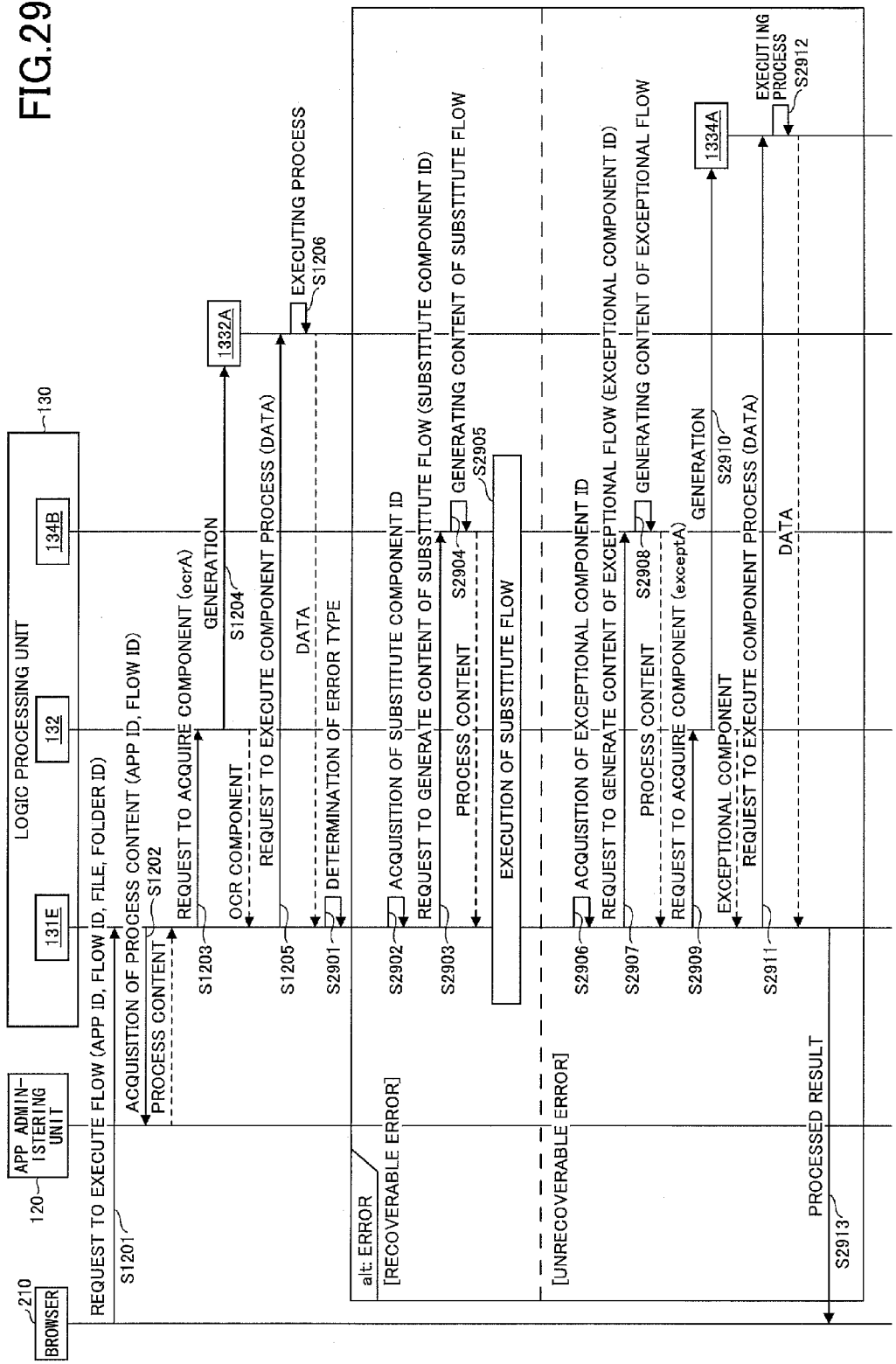
FIG. 29 is a sequence chart of an exemplary flow execution process of the sixth embodiment.

Referring to FIG. 29, described next is the case where the error occurs during the flow execution process. FIG. 29 is a sequence chart of an exemplary flow execution process of the sixth embodiment. Because the processes of steps S1201 to S1206 are similar to the processes of the first embodiment, the description of these processes is omitted.

When the flow executing unit 131E receives data indicating that the error occurs, the flow executing unit 131E determines whether the error is a recoverable error (step S2901).

Here, the recoverable error is the error type, in which the component of the substitute component ID may be executed. Such an error type includes, for example, a temporary network error.

Here, the unrecoverable error is the error type, in which the component of the substitute component ID may not be executed. Such an error type includes, for example, an error indicating that the data input into the component are incorrect.

In a case where the occurred error is determined to be the recoverable error in step S2901, the flow executing unit 131E executes the processes of steps S2902 to step S2905. In a case where the occurred error is determined to be the unrecoverable error in step S2901, the flow executing unit 131E executes the processes of steps S2906 to step S2913.

In the case where the occurred error is determined to be the unrecoverable error, the flow executing unit 131E refers to the substitute-component administering table 4000B and acquires the corresponding substitute component ID (step S2902). Said differently, the flow executing unit 131E acquires the substitute component ID "ocrB" associated with the flow ID "flow001" of the process content 1100 acquired in step S1202 and the substitute component ID "ocrB" associated with the component ID "ocrA" of the OCR component 1332A.

Next, the flow executing unit 131E sends a generation request to generate the substitute flow content including the acquired substitute component ID "ocrB" to the substitute-flow content-generating unit 134B (step S2903).

After the substitute-flow content-generating unit 134B receives the generation request of the substitute flow content, the substitute-flow content-generating unit 134B generates the substitute flow content based on the substitute component ID "ocrB" included in the generation request (step S2904). Said differently, the substitute-flow content-generating unit 134 changes the component ID "ocrA" included in the process content 1100 to the substitute component ID "ocrB" to generate the process content 1300 illustrated in FIG. 22.

The substitute-flow content-generating unit 134B returns the generated process content 1300 to the flow executing unit 131C.

Next, the flow executing unit 131E executes the substitute flow based on the acquired process content 1300 (step S2905). In this case, the processes similar to steps S2104 to S2116 are conducted.

In the case where the occurred error is determined to be the unrecoverable error, the flow executing unit 131E refers to the substitute-component administering table 4000B and acquires the exceptional component ID (step S2906). Said differently, the flow executing unit 131E acquires the exceptional component ID "exceptA" associated with the flow ID "flow001" of the process content 1100 acquired in step S1202 and the component ID "ocrA" of the OCR component 1332A.

Next, the flow executing unit 131E sends a generation request to generate the substitute flow content including the acquired exceptional component ID "exceptA" to the substitute-flow content-generating unit 134B (step S2907).

After the substitute-flow content-generating unit 134B receives the generation request of the substitute flow content, the substitute-flow content-generating unit 134B generates the substitute flow content based on the exceptional component ID "exceptA" included in the generation request (step S2908). Said differently, the substitute-flow content-generating unit 134B generates a process content 1500 illustrated in FIG. 30.

The substitute-flow content-generating unit 134B returns the generated process content 1500 to the flow executing unit 131E.

In the process content 1500 illustrated in FIG. 30, ".to ("process:exceptA")" is designated as indicated by a broken line 1501. With this, the sequence of processes (the substitute flow) based on the process content 1500 can be performed by the exceptional component 1334A.

The flow execution unit 131E requests the component administering unit 132 to acquire the component in accordance with the acquired process content 1500 (step S2909). More specifically, the flow executing unit 131E requests the component administering unit 132 to acquire the exceptional component 1334A based on ".to("process:exceptA")" designated in the process content 1500 illustrated in FIG. 30.

When the component administering unit 132 receives the acquisition request to acquire the exceptional component 1334A, the component administering unit 132 generates the exceptional component 1334A (step S2910). When the exceptional component 1334A is generated, the component administering unit 132 returns the exceptional component 1334A to the flow executing unit 131E.

The flow executing unit 131E designates data and requests the generated exceptional component 1334A to execute the process (step S2911).

When the exceptional component 1334A receives the execution request of the process, in which the data are designated, the exceptional component 1334A executes the process to the designated data (step S2912). The exceptional component 1334A executes an exceptional process such as an output of error information and an error report.

The exceptional component 1334A returns the data indicative of the processed result of the process to the flow executing unit 131E.

The flow executing unit 131E returns the processed result of the sequence of processes (the substitute flow) acquired based on the process content 1500 to the browser 210 (step S2913). With this, the user of the image forming apparatus 20 can know that the unrecoverable error occurs in the sequence of processes (the process flow) substantializing the scan delivery service and the exceptional component is executed in place of the component, in which the error occurs.

As described, in the service providing system 10, in the case where the error or the like occurs in the component executed in the process flow, the substitute component ID or the exceptional component ID is acquired in response to whether the error is recoverable. In the service providing system 10 of the sixth embodiment, in the case where the exceptional component ID is acquired, the exceptional component performing the exceptional process such as an output of the error information and the error report is executed.

Therefore, in the service providing system 10 of the sixth embodiment, for example, in a case where an unrecoverable serious error occurs in the process flow, the exceptional process for reporting the occurrence of the error to the image forming apparatus 20 may be executed.

According to the embodiments, the substitute process of the sequence of processes being in collaboration with the external service is enabled to be executed.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system has been described in detail, it should be understood that various changes, substitutions, and alterations could be made thereto without departing from the spirit and scope of the invention.

A method carried out based on this disclosure is not limited to the disclosed order of processes of the method.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus."

What is claimed is:

1. An information processing system including at least one information processing apparatus and also including at least one program respectively executing predetermined processes, the information processing system comprising a hardware processor and a hardware storage,
   wherein the hardware storage is configured to implement
      a first memory unit storing, for each application executing a sequence of processes using electronic data, flow information which defines program identification information for identifying the at least one program executing each process of the sequence of processes and an execution order of the at least one program,
      application (app) identification information identifying application (app) identification information, and
      flow identification information identifying flow identification information while associating the flow information, the application (app) identification information, and flow identification information; and
   a second memory unit storing
      first flow identification information identifying first flow information which defines the program identification information for identifying the at least one program executing each process of a first sequence of processes and an execution order of the at least one program,
      program identification information identifying the at least one program executing each process of a second sequence of processes, which is automatically executed in response to an error that occurs in the first sequence of processes, and
      second flow identification information identifying second flow information defining the execution order of the at least one program while associating the first flow information, the program identification information, and the second flow identification information,
   wherein the hardware processor is configured to implement
      a receiving unit receiving a request including the application (app) identification information, the first flow identification information, information related to electronic data used in the first sequence of processes from one apparatus among from at least one apparatus coupled to the information processing system; and
      a process executing unit automatically causing each program of the at least one program identified by the program identification information defined by the first flow identification information included in the request from among the flow information stored in the first memory unit in association with the application (app) identification information included in the request received by the receiving unit to be executed according to the execution order defined in the first flow information to execute the first sequence of processes the electronic data,
      wherein the process executing unit, in response to the error occurring in the first sequence of processes, automatically causes each program of the at least one program identified by the program identification information defined by the second flow information stored in the first memory unit to be executed in the execution order defined in the second flow information to execute the second sequence of processes using the electronic data.

2. The information processing system according to claim 1,
   wherein the hardware processor further implements
   a sending unit sending a processed result of the second sequence of processes to the one apparatus in response to an execution of the second sequence of processes by the process executing unit.

3. The information processing system according to claim 2,
  wherein the second memory unit stores the first flow identification information, the second flow identification information, and information indicative of a type of the second sequence of processes while associating the first flow identification information and the second flow identification information with the information indicative of the type of the second sequence of processes, and
  wherein the sending unit sends the processed result corresponding to the information indicative of the type of the second sequence of processes to the one apparatus in response to the execution of the second sequence of processes by the process executing unit.

4. The information processing system according to claim 1,
  wherein the hardware processor includes a determining unit determining a type of an error occurring in the first sequence of processes in response to the occurrence of the error,
  wherein the second memory unit stores the first flow identification information, the second flow identification information, the program identification information identifying the at least one program executing each process of a third sequence of processes different from the second sequence of processes, and third flow identification information identifying third flow information in which the execution order of the at least one program is defined while associating the first flow identification information and the second flow identification information with the program identification information identifying the at least one program executing each process of a third sequence of processes different from the second sequence of processes and third flow identification information, and
  wherein the process executing unit, in response to the occurrence of the error in the first sequence of processes, determines a type of the occurred error by the determining unit, and causes each program of the at least one program identified by the program identification information that is defined by any one of the second flow identification information and the third flow identification information, which are stored in the second memory unit in association with the first flow identification information, to be executed in accordance with the execution order defined in the any one of the second flow identification information and the third flow identification information in response to a determined result of the determination to execute the second sequence of processes or the third sequence of processes using the electronic data.

5. The information processing system according to claim 1,
  wherein the at least one program includes a program executing a process related to an external service, which includes a program executing a process of uploading the electronic data to the external service.

6. An information processing apparatus including at least one program respectively executing predetermined processes, the information processing apparatus comprising a hardware processor and a hardware storage,
  wherein the hardware storage is configured to implement
    a first memory unit storing, for each application executing a sequence of processes using electronic data, flow information which defines program identification information for identifying the at least one program executing each process of the sequence of processes and an execution order of the at least one program,
    application (app) identification information identifying application (app) identification information, and
    flow identification information identifying flow identification information while associating the flow information, the application (app) identification information, and flow identification information; and
  a second memory unit storing
    first flow identification information identifying first flow information which defines the program identification information for identifying the at least one program executing each process of a first sequence of processes and an execution order of the at least one program,
    program identification information identifying the at least one program executing each process of a second sequence of processes, which is automatically executed in response to an error that occurs in the first sequence of processes, and
    second flow identification information identifying second flow information defining the execution order of the at least one program while associating the first flow information, the program identification information, and the second flow identification information,
  wherein the hardware processor is configured to implement
    a receiving unit receiving a request including the application (app) identification information, the first flow identification information, information related to electronic data used in the first sequence of processes from one apparatus among from at least one apparatus coupled to the information processing system; and
    a process executing unit automatically causing each program of the at least one program identified by the program identification information defined by the first flow identification information included in the request from among the flow information stored in the first memory unit in association with the application (app) identification information included in the request received by the receiving unit to be executed according to the execution order defined in the first flow information to execute the first sequence of processes the electronic data,
    wherein the process executing unit, in response to the error occurring in the first sequence of processes, automatically causes each program of the at least one program identified by the program identification information defined by the second flow information stored in the first memory unit to be executed in the execution order defined in the second flow information to execute the second sequence of processes using the electronic data.

7. The information processing apparatus according to claim 6,
  wherein the hardware processor further implements
  a sending unit sending a processed result of the second sequence of processes to the one apparatus in response to an execution of the second sequence of processes by the process executing unit.

8. The information processing apparatus according to claim 7,
  wherein the second memory unit stores the first flow identification information, the second flow identification information, and information indicative of a type of the second sequence of processes while associating the first flow identification information and the second flow identification information with the information indicative of the type of the second sequence of processes, and wherein the sending unit sends the processed result corresponding to the information indicative of the type of the second sequence of processes to the one apparatus in response to the execution of the second sequence of processes by the process executing unit.

9. The information processing apparatus according to claim 6, wherein the hardware processor includes a determining unit determining a type of an error occurring in the first sequence of processes in response to the occurrence of the error, wherein the second memory unit stores the first flow identification information, the second flow identification information, the program identification information identifying the at least one program executing each process of a third sequence of processes different from the second sequence of processes, and third flow identification information identifying third flow information in which the execution order of the at least one program is defined while associating the first flow identification information and the second flow identification information with the program identification information identifying the at least one program executing each process of a third sequence of processes different from the second sequence of processes and third flow identification information, and wherein the process executing unit, in response to the occurrence of the error in the first sequence of processes, determines a type of the occurred error by the determining unit, and causes each program of the at least one program identified by the program identification information that is defined by any one of the second flow identification information and the third flow identification information, which are stored in the second memory unit in association with the first flow identification information, to be executed in accordance with the execution order defined in the any one of the second flow identification information and the third flow identification information in response to a determined result of the determination to execute the second sequence of processes or the third sequence of processes using the electronic data.

10. The information processing apparatus according to claim 6, wherein the at least one program includes a program executing a process related to an external service, which includes a program executing a process of uploading the electronic data to the external service.

11. A method for processing information using an information processing system including at least one information processing apparatus and also including at least one program respectively executing predetermined processes, the information processing system including a hardware storage configured to implement a first memory unit storing, for each application executing a sequence of processes using electronic data, flow information which defines program identification information for identifying the at least one program executing each process of the sequence of processes and an execution order of the at least one program, application (app) identification information identifying application (app) identification information, and flow identification information identifying flow identification information while associating the flow information, the application (app) identification information, and flow identification information; and a second memory unit storing first flow identification information identifying first flow information which defines the program identification information for identifying the at least one program executing each process of a first sequence of processes and an execution order of the at least one program, program identification information identifying the at least one program executing each process of a second sequence of processes, which is automatically executed in response to an error that occurs in the first sequence of processes, and second flow identification information identifying second flow information defining the execution order of the at least one program while associating the first flow information, the program identification information, and the second flow identification information, the method for processing the information comprising:

receiving, by a hardware processor included in the information processing system, a request including the application (app) identification information, the first flow identification information, information related to electronic data used in the first sequence of processes from one apparatus among from at least one apparatus coupled to the information processing system; and automatically causing, by the hardware processor, each program of the at least one program identified by the program identification information defined by the first flow identification information included in the request from among the flow information stored in the first memory unit in association with the application (app) identification information included in the request received by the receiving to be executed according to the execution order defined in the first flow information to execute the first sequence of processes the electronic data, wherein the causing, in response to the error occurring in the first sequence of processes, automatically causes each program of the at least one program identified by the program identification information defined by the second flow information stored in the first memory unit to be executed in the execution order defined in the second flow information to execute the second sequence of processes using the electronic data.

12. The method for processing information according to claim 11, the method further comprising:

a sending unit sending, by the hardware processor, a processed result of the second sequence of processes to the one apparatus in response to an execution of the second sequence of processes by the causing.

13. The method for processing information according to claim 12, wherein the second memory unit stores the first flow identification information, the second flow identification information, and information indicative of a type of the second sequence of processes while associating the first flow identification information and the second flow identification information with the information indicative of the type of the second sequence of processes, and wherein the sending sends the processed result corresponding to the information indicative of the type of the second sequence of processes to the one apparatus in response to the execution of the second sequence of processes by the causing.

14. The method for processing information according to claim 11, the method further comprising:
determining a type of an error occurring in the first sequence of processes in response to the occurrence of the error,
wherein the second memory unit stores the first flow identification information, the second flow identification information, the program identification information identifying the at least one program executing each process of a third sequence of processes different from the second sequence of processes, and third flow identification information identifying third flow information in which the execution order of the at least one program is defined while associating the first flow identification information and the second flow identification information with the program identification information identifying the at least one program executing each process of a third sequence of processes different from the second sequence of processes and third flow identification information, and
wherein the causing, in response to the occurrence of the error in the first sequence of processes, determines a type of the occurred error by the determining unit, and causes each program of the at least one program identified by the program identification information that is defined by any one of the second flow identification information and the third flow identification information, which are stored in the second memory unit in association with the first flow identification information, to be executed in accordance with the execution order defined in the any one of the second flow identification information and the third flow identification information in response to a determined result of the determination to execute the second sequence of processes or the third sequence of processes using the electronic data.

15. The method for processing information according to claim 11,
wherein the at least one program includes a program executing a process related to an external service, which includes a program executing a process of uploading the electronic data to the external service.

* * * * *